(12) United States Patent
Song et al.

(10) Patent No.: US 7,570,332 B2
(45) Date of Patent: *Aug. 4, 2009

(54) LIQUID CRYSTAL DISPLAYS HAVING MULTI-DOMAINS AND A MANUFACTURING METHOD THEREOF

(75) Inventors: Jang-Kun Song, Seoul (KR); Seung-Beom Park, Yongin (KR); Byoung-Sun Na, Suwon (KR)

(73) Assignee: Samsung Electronics Co., Ltd. (KR)

( * ) Notice: Subject to any disclaimer, the term of this patent is extended or adjusted under 35 U.S.C. 154(b) by 0 days.

This patent is subject to a terminal disclaimer.

(21) Appl. No.: 11/875,071

(22) Filed: Oct. 19, 2007

(65) Prior Publication Data
US 2008/0079886 A1 Apr. 3, 2008

Related U.S. Application Data

(63) Continuation of application No. 09/311,718, filed on May 14, 1999, now Pat. No. 6,710,837, and a continuation of application No. 10/684,524, filed on Oct. 15, 2003, now Pat. No. 6,954,248, and a continuation of application No. 11/068,461, filed on Feb. 23, 2005.

(30) Foreign Application Priority Data

May 16, 1998 (KR) .................... 10-1998-0017734

(51) Int. Cl.
G02F 1/1337 (2006.01)
G02F 1/1343 (2006.01)
(52) U.S. Cl. ........................ 349/129; 349/139
(58) Field of Classification Search ........... 349/129, 349/139, 143
See application file for complete search history.

(56) References Cited

U.S. PATENT DOCUMENTS 4,385,806 A 5/1983 Fergason (Continued)

FOREIGN PATENT DOCUMENTS

EP 0445777 A2 9/1991

(Continued)

OTHER PUBLICATIONS

"MVA Liquid Crystal Technology—Latest Version of VA Liquid Crystals"-Kenji Okamoto; Nikkei Flat Panel Display, pp. 104-107; 1998.

(Continued)

*Primary Examiner*—Dung T. Nguyen
(74) *Attorney, Agent, or Firm*—Cantor Colburn LLP

(57) ABSTRACT

A liquid crystal display includes; a first substrate, a gate line disposed on the first substrate, a pixel electrode disposed on the first substrate, a second substrate facing the first substrate, a common electrode disposed on the second substrate, a first domain partitioning member disposed on one of the first substrate and the second substrate and including a first portion disposed in a direction substantially parallel to the gate line, a second portion obliquely extending from an end of the first portion, and a third portion obliquely extending from the end of the first portion, and a second domain partitioning member disposed on one of the first substrate and the second substrate and including a fourth portion disposed in a direction substantially parallel to the gate line.

88 Claims, 21 Drawing Sheets

U.S. PATENT DOCUMENTS

| | | | |
|---|---|---|---|
| 4,701,028 A | 10/1987 | Clerc et al. | |
| 4,786,147 A | 11/1988 | Clerc et al. | |
| 4,878,742 A | 11/1989 | Ohkubo et al. | |
| 4,889,412 A | 12/1989 | Clerc et al. | |
| 5,136,407 A | 8/1992 | Clerc | |
| 5,229,873 A | 7/1993 | Hirose et al. | |
| 5,298,199 A | 3/1994 | Hirose et al. | |
| 5,309,264 A | 5/1994 | Lien et al. | |
| 5,434,690 A | 7/1995 | Hisatake et al. | |
| 5,473,455 A | 12/1995 | Koike et al. | |
| 5,579,140 A | 11/1996 | Yamahara et al. | |
| 5,583,679 A | 12/1996 | Ito et al. | |
| 5,608,556 A | 3/1997 | Koma | |
| 5,673,092 A | 9/1997 | Horie et al. | |
| 5,745,206 A | 4/1998 | Koike et al. | |
| 5,757,451 A | 5/1998 | Miyazaki et al. | |
| 5,872,611 A | 2/1999 | Hirata et al. | |
| 5,907,380 A | 5/1999 | Lien | |
| 5,917,572 A | 6/1999 | Kurauchi et al. | |
| 5,953,093 A | 9/1999 | Hirata et al. | |
| 5,986,732 A | 11/1999 | Ozeki et al. | |
| 5,995,190 A | 11/1999 | Nagae et al. | |
| 6,061,116 A | 5/2000 | Nishida et al. | |
| 6,061,117 A | 5/2000 | Horie et al. | |
| 6,141,074 A | 10/2000 | Bos et al. | |
| 6,147,729 A | 11/2000 | Kurachi et al. | |
| 6,191,836 B1 | 2/2001 | Woo et al. | |
| 6,256,080 B1 | 7/2001 | Colgan et al. | |
| 6,266,116 B1 | 7/2001 | Ohta et al. | |
| 6,266,166 B1 | 7/2001 | Katsumata et al. | |
| 6,285,431 B2 | 9/2001 | Lyu et al. | |
| 6,288,762 B1 | 9/2001 | Sasaki et al. | |
| 6,342,938 B1 * | 1/2002 | Song et al. | 349/143 |
| 6,407,794 B2 | 6/2002 | Koma | |
| 6,567,144 B1 | 5/2003 | Kim et al. | |
| 6,704,083 B1 | 3/2004 | Kim et al. | |
| 6,710,837 B1 | 3/2004 | Song et al. | |
| 6,724,452 B1 | 4/2004 | Takeda et al. | |
| 6,738,120 B1 * | 5/2004 | Song et al. | 349/139 |
| 6,954,248 B2 | 10/2005 | Song et al. | |

FOREIGN PATENT DOCUMENTS

| | | |
|---|---|---|
| EP | 0 636 917 A1 | 2/1995 |
| EP | 0676661 A2 | 10/1995 |
| EP | 0854377 A2 | 7/1998 |
| EP | 0568355 B1 | 6/2000 |
| EP | 0621501 B1 | 11/2002 |
| GB | 1462978 | 1/1977 |
| JP | 60-256121 | 12/1985 |
| JP | 01189629 | 7/1989 |
| JP | 01196020 | 8/1989 |
| JP | 02035416 | 2/1990 |
| JP | 02151830 | 6/1990 |
| JP | 02190825 | 7/1990 |
| JP | 03043701 | 2/1991 |
| JP | 03209220 | 9/1991 |
| JP | 03261914 | 11/1991 |
| JP | 04251285 | 9/1992 |
| JP | 05173142 | 7/1993 |
| JP | 05203933 | 8/1993 |
| JP | 06043461 | 2/1994 |
| JP | 06082777 | 3/1994 |
| JP | 06194656 | 7/1994 |
| JP | 06258649 | 9/1994 |
| JP | 06301036 | 10/1994 |
| JP | 07013164 | 1/1995 |
| JP | 07020469 A | 1/1995 |
| JP | 07028063 | 1/1995 |
| JP | 07043719 | 2/1995 |
| JP | 07064089 A | 3/1995 |
| JP | 07104450 | 4/1995 |
| JP | 07120767 | 5/1995 |
| JP | 07147426 | 6/1995 |
| JP | 07199190 | 8/1995 |
| JP | 07199193 | 8/1995 |
| JP | 07199205 | 8/1995 |
| JP | 07225389 | 8/1995 |
| JP | 07230097 A | 8/1995 |
| JP | 07-234414 | 9/1995 |
| JP | 07234414 | 9/1995 |
| JP | 07281195 | 10/1995 |
| JP | 7311383 | 11/1995 |
| JP | 07318950 | 12/1995 |
| JP | 07333617 | 12/1995 |
| JP | 08-015714 | 1/1996 |
| JP | 08006052 | 1/1996 |
| JP | 08015714 | 1/1996 |
| JP | 08022023 | 1/1996 |
| JP | 08029790 | 2/1996 |
| JP | 08029812 | 2/1996 |
| JP | 08043825 | 2/1996 |
| JP | 08076125 | 3/1996 |
| JP | 2507122 | 4/1996 |
| JP | 08095054 | 4/1996 |
| JP | 08101396 | 4/1996 |
| JP | 08101399 A | 4/1996 |
| JP | 08220511 A | 8/1996 |
| JP | 08220524 A | 8/1996 |
| JP | 08292423 | 11/1996 |
| JP | 09033882 | 2/1997 |
| JP | 09043592 | 2/1997 |
| JP | 09105908 | 4/1997 |
| JP | 09120072 | 5/1997 |
| JP | 09120075 | 5/1997 |
| JP | 09160061 | 6/1997 |
| JP | 10048634 | 2/1998 |
| JP | 10301114 | 11/1998 |
| JP | 11109358 | 4/1999 |
| JP | 11242225 | 9/1999 |
| JP | 11305236 | 11/1999 |
| KR | 19930018308 | 9/1993 |
| WO | 9712275 | 4/1997 |

OTHER PUBLICATIONS

Koma N, Baba Y, Matsuoka K "No-rub multi-domain TFT-LCD using surrounding-electrode method" SID International Symposium Digest of Technical Papers, 1995 - Society for Information Display pp. 869-872.

* cited by examiner

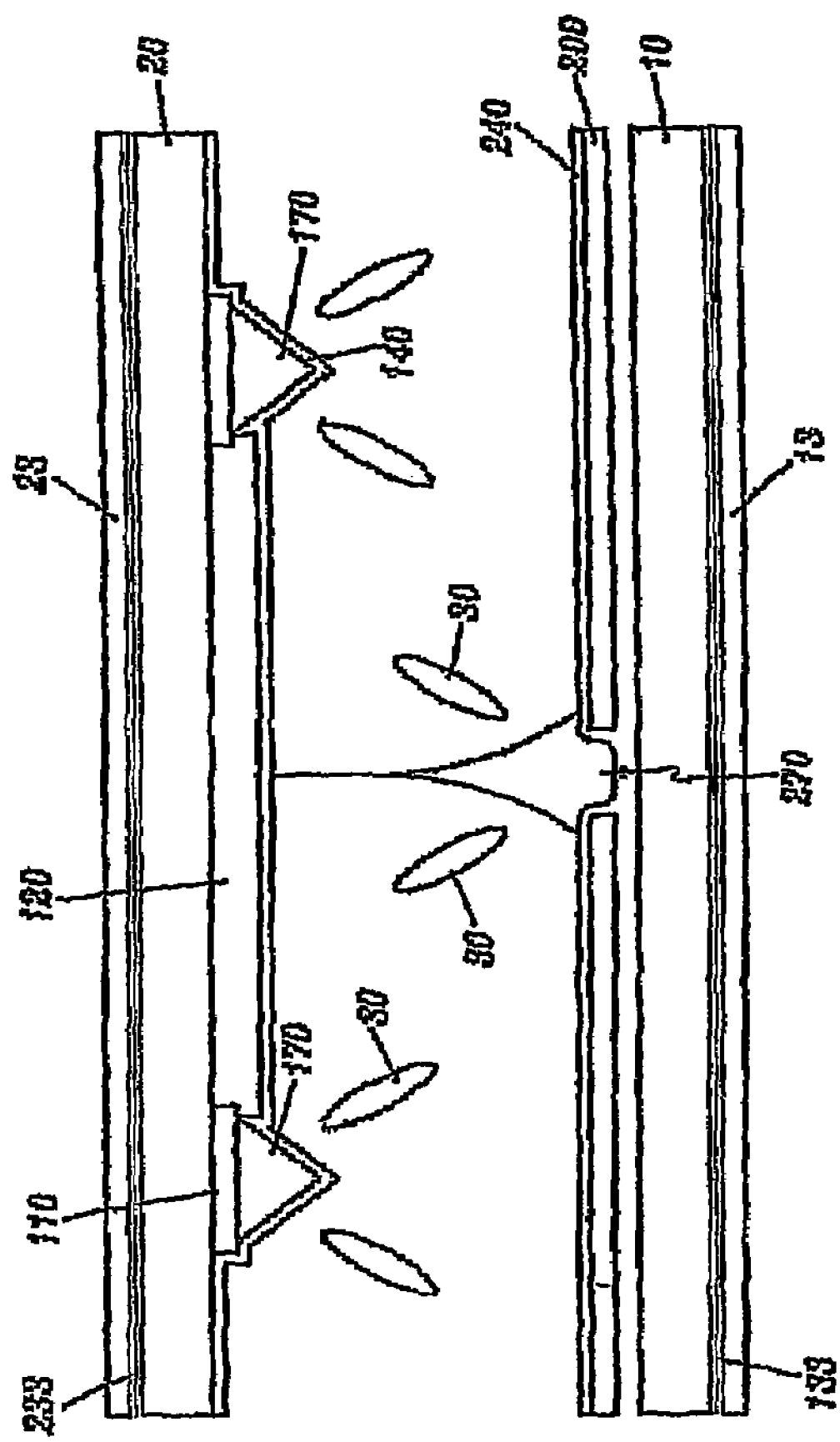

LIQUID CRYSTAL DISPLAYS HAVING MULTI-DOMAINS AND A MANUFACTURING METHOD THEREOF

CROSS REFERENCE TO RELATED APPLICATIONS

This application is a Continuation Application of co-pending U.S. patent application Ser. No. 11/068,461 filed on Feb. 23, 2005, which is a Continuation Application of U.S. patent application Ser. No. 10/684,524 filed on Oct. 15, 2003, issued as U.S. Pat. No. 6,954,248 on Oct. 11, 2005, which is a Continuation Application of U.S. patent application Ser. No. 09/311,718 filed on May 14, 1999, issued as U.S. Pat. No. 6,710,837 on Mar. 23, 2004, which claims priority to and the benefit of Korean Patent Application No. 1998-17734 filed on May 16, 1998, which are all hereby incorporated by reference for all purposes as if fully set forth herein.

BACKGROUND OF THE INVENTION (a) Field of the Invention

The present invention relates to liquid crystal displays (LCDs) and a manufacturing method thereof, in particular, to vertically-aligned liquid crystal displays (VA LCDs) having multi-domains in a pixel region and a manufacturing method thereof.

(b) Description of the Related Art

A liquid crystal display (LCD) includes two substrates and a liquid crystal layer interposed therebetween. The transmittance of the incident light is controlled by the strength of the electric field applied to the liquid crystal layer.

A vertically aligned twisted nematic (VATN) liquid crystal display has a couple of transparent substrates which have transparent electrodes respectively on their inner surfaces, a chiral nematic liquid crystal layer having negative anisotropy between the substrates and a couple of polarizers which are respectively attached to the outer surfaces of the substrates In the off state of the LCD, i.e., in the state that the electric field is not applied to the liquid crystal layer, the molecular axes or the long axes of the liquid crystal molecules are perpendicular to the substrates. On the other hand, in the on state of the LCD, i.e., in the state that the sufficient electric field caused by the voltage difference between the electrodes is applied to the liquid crystal layer, the long axes of the liquid crystal molecules are parallel to the substrates by the negative anisotropy and twisted spirally by the chirality with a pitch from the inner surface of one substrate to that of the other substrate. Accordingly, the orientation of the long axes of the liquid crystal molecules vary continuously.

A VATN LCD in normally black mode may have an off state which is sufficiently dark because the molecular axes of the liquid crystal molecules are uniformly aligned perpendicular to the substrates in the off state. Therefore, the contrast ratio is relatively high compared with a conventional TN LCD. In addition, the viewing angle may be strongly dependent on the viewing directions. Therefore, it is suggested to form multi-domains in a pixel by providing apertures in the electrode by Clere in U.S. Pat. No. 5,136,407 and by Hirose in U.S. Pat. No. 5,229,873, etc.

BRIEF SUMMARY OF THE INVENTION

One aspect of the present invention is to form patterns for multi-domains to enlarge the range of viewing angle.

Another aspect of the present invention is to reduce forming patterns for multi-domains.

Another aspect of the present invention is to reduce light the boundary of multi-domains to improve the contrast ratio.

In one exemplary embodiment, a liquid crystal display includes; a first substrate, a gate line disposed on the first substrate, a pixel electrode disposed on the first substrate, a second substrate facing the first substrate, a common electrode disposed on the second substrate, a first domain partitioning member disposed on one of the first substrate and the second substrate and including a first portion disposed in a direction substantially parallel to the gate line, a second portion obliquely extending from an end of the first portion, and a third portion obliquely extending from the end of the first portion; and a second domain partitioning member disposed on one of the first substrate and the second substrate and including a fourth portion disposed in a direction substantially parallel to the gate line.

In another exemplary embodiment, the first domain partitioning member includes a fifth portion extending in a direction substantially parallel to the second portion and a sixth portion extending in a direction substantially parallel to the third portion.

In another exemplary embodiment, the first domain partitioning member includes a seventh portion extending from the fifth portion and an eighth portion extending from the sixth portion, and the seventh portion and the eighth portion extend in a direction substantially perpendicular to the gate line.

In another exemplary embodiment, the seventh and the eighth portions overlap at least one edge of the pixel electrode.

In another exemplary embodiment, the first domain partitioning member is a protrusion disposed on the common electrode and the second domain partitioning member is an aperture of the pixel electrode.

In another exemplary embodiment, the first portion and the fourth portion are disposed substantially parallel to one another along a straight line.

In another exemplary embodiment, the first domain partitioning member is a protrusion disposed on the common electrode and the second domain partitioning member is an aperture of the pixel electrode.

In another exemplary embodiment, a liquid crystal display includes; a first substrate, a gate line disposed on the first substrate, a pixel electrode disposed on the first substrate, a second substrate facing the first substrate, a common electrode disposed on the second substrate, a first domain partitioning member disposed on one of the first substrate and the second substrate and including a first portion extending in a direction substantially oblique to the gate line and a second portion obliquely extending from an end of second portion, and a second domain partitioning member disposed on one of the first substrate and the second substrate and including a third portion disposed in a direction substantially parallel to the gate line.

In another exemplary embodiment, the first portion and the second portion form a wedge-shape.

In another exemplary embodiment, the first domain partitioning member includes a fourth portion extending from the first portion and a fifth portion extending from the second portion, the fourth portion and the fifth portion extend in a direction substantially perpendicular to the gate line.

In another exemplary embodiment, the first domain partitioning member includes a sixth portion extending in a direction substantially parallel to the first portion and a seventh portion extending in a direction substantially parallel to the second portion.

In another exemplary embodiment, the first domain partitioning member includes an eighth portion extending from the sixth portion and a ninth portion extending from the seventh portion, and the eighth portion and the ninth portion extend in a direction substantially perpendicular to the gate line.

In another exemplary embodiment, the fourth and the fifth portion overlap at least one edge of the pixel electrode.

In another exemplary embodiment, the eighth and the ninth portion overlap at least one edge of the pixel electrode.

In another exemplary embodiment, the first domain partitioning member is a protrusion disposed on the common electrode and the second domain partitioning member is an aperture of the pixel electrode.

In another exemplary embodiment, the first domain partitioning member includes a sixth portion extending in a direction substantially parallel to the first portion and a seventh portion extending in a direction substantially parallel to the second portion.

In another exemplary embodiment, the first domain partitioning member includes an eighth portion extending from the sixth portion and a ninth portion extending from the seventh portion, the eighth portion and the ninth portion extend in a direction substantially perpendicular to the gate line.

In another exemplary embodiment, the eighth and the ninth portion overlap at least one edge of the pixel electrode.

In another exemplary embodiment, the first domain partitioning member is a protrusion disposed on the common electrode and the second domain partitioning member is an aperture of the pixel electrode.

In another exemplary embodiment, the first domain partitioning member is a protrusion disposed on the common electrode and the second domain partitioning member is an aperture of the pixel electrode.

In another exemplary embodiment, a liquid crystal display includes; a first substrate, a gate line disposed on the first substrate, a pixel electrode disposed on the first substrate, a second substrate facing the first substrate, a common electrode disposed on the second substrate, a first domain partitioning member disposed on one of the first substrate and the second substrate and including a first portion disposed in a direction substantially parallel to the gate line, a second portion obliquely extending from an end of the first portion, a third portion obliquely extending from the end of the first portion, a fourth portion extending from the second portion, and a fifth portion extending from the third portion, and a second domain partitioning member disposed on one of the first substrate and the second substrate and including a sixth portion disposed in a direction substantially parallel to the gate line, wherein the fourth portion and the fifth portion extend in a direction substantially perpendicular to the gate line.

In another exemplary embodiment, the fourth and the fifth portion overlap at least one edge of the pixel electrode.

In another exemplary embodiment, the first domain partitioning member includes a seventh portion extending in a direction substantially parallel to the second portion and an eighth portion extending in a direction substantially parallel to the third portion.

In another exemplary embodiment, the first domain partitioning member includes a ninth portion extending from the seventh portion and a tenth portion extending from the eighth portion.

In another exemplary embodiment, the ninth portion and the tenth portion extend in a direction substantially perpendicular to the gate line.

In another exemplary embodiment, the first portion and the sixth portion are disposed substantially parallel to one another along a straight line.

In another exemplary embodiment, the first domain partitioning member is a protrusion disposed on the common electrode and the second domain partitioning member is an aperture of the pixel electrode.

In another exemplary embodiment, the first domain partitioning member is a protrusion disposed on the common electrode and the second domain partitioning member is an aperture of the pixel electrode.

In another exemplary embodiment, a liquid crystal display includes; a first substrate, a gate line disposed on the first substrate, a pixel electrode disposed on the first substrate, a second substrate facing the first substrate, a common electrode disposed on the second substrate, a first domain partitioning member disposed on one of the first substrate and the second substrate and including a first portion disposed in a direction substantially parallel to the gate line, a second portion obliquely extending from an end of the first portion, and a third portion obliquely extending from the end of the first portion, and a second domain partitioning member disposed on one of the first substrate and the second substrate and including a fourth portion disposed in a direction substantially parallel to the second portion and a fifth portion disposed in a direction substantially parallel to the third portion.

In another exemplary embodiment, the first domain partitioning member includes a sixth portion extending in a direction substantially parallel to the second portion and a seventh portion extending in a direction substantially parallel to the third portion.

In another exemplary embodiment, the first domain partitioning member includes an eighth portion extending from the sixth portion and a ninth portion extending from the seventh portion, and the eighth portion and the ninth portion extend in a direction substantially perpendicular to the gate line.

In another exemplary embodiment, the eighth and the ninth portions overlap at least one edge of the pixel electrode.

In another exemplary embodiment, the first domain partitioning member and the second domain partitioning member are alternately disposed along an axis of the pixel electrode.

In another exemplary embodiment, the first domain partitioning member is a protrusion disposed on the common electrode and the second domain partitioning member is an aperture of the pixel electrode.

In another exemplary embodiment, the first domain partitioning member and the second domain partitioning member are alternately disposed along an axis of the pixel electrode.

In another exemplary embodiment, the first domain partitioning member is a protrusion disposed on the common electrode and the second domain partitioning member is an aperture of the pixel electrode.

In another exemplary embodiment, the second portion and the third portion form a wedge-shape.

In another exemplary embodiment, the first domain partitioning member and the second domain partitioning member are substantially symmetric about a line substantially parallel to the first portion.

In another exemplary embodiment, a liquid crystal display includes; a first substrate, a gate line disposed on the first substrate, a pixel electrode disposed on the first substrate, a second substrate facing the first substrate, a common electrode disposed on the second substrate, a first domain partitioning member disposed on one of the first substrate and the second substrate and including a first portion extending in a direction substantially oblique to the gate line, a second portion obliquely extending from an end of the first portion, a third portion extending from the first portion and a fourth portion extending from the second portion, and a second domain partitioning member disposed on one of the first substrate and the second substrate and including a fifth portion disposed in a direction substantially parallel to the first portion and a sixth portion disposed in a direction substantially parallel to the second portion, wherein the third portion and the fourth portion extend in a direction substantially perpendicular to the gate line.

In another exemplary embodiment, the first domain partitioning member includes a seventh portion extending in a direction substantially parallel to the first portion and an eighth portion extending in a direction substantially parallel to the second portion.

In another exemplary embodiment, the first domain partitioning member includes a ninth portion extending from the seventh portion and a tenth portion extending from the eighth portion, the ninth portion and the tenth portion extend in a direction substantially perpendicular to the gate line.

In another exemplary embodiment, the ninth and the tenth portions overlap at least one edge of the pixel electrode.

In another exemplary embodiment, the first domain partitioning member is a protrusion disposed on the common electrode and the second domain partitioning member is an aperture of the pixel electrode.

In another exemplary embodiment, the first domain partitioning member is a protrusion disposed on the common electrode and the second domain partitioning member is an aperture of the pixel electrode.

In another exemplary embodiment, the first portion and the second portion form a wedge-shape.

In another exemplary embodiment, a liquid crystal display includes; a first substrate, a gate line disposed on the first substrate, a pixel electrode disposed on the first substrate, a second substrate disposed facing the first substrate, a common electrode disposed on the second substrate, a first domain partitioning member disposed on one of the first substrate and the second substrate and including a first portion disposed in a direction substantially parallel to the gate line, a second portion obliquely extending from an end of the first portion, a third portion obliquely extending from the end of the first portion, a fourth portion extending from the second portion, and a fifth portion extending from the third portion, wherein the fourth portion and the fifth portion extend in a direction substantially perpendicular to the gate line, and a second domain partitioning member disposed on one of the first substrate and the second substrate and including a sixth portion disposed in a direction substantially parallel to the second portion and a seventh portion disposed in a direction substantially parallel to the third portion.

In another exemplary embodiment, the fourth and fifth portions overlap at least one edge of the pixel electrode.

In another exemplary embodiment, the first domain partitioning member includes an eighth portion extending in a direction substantially parallel to the second portion and a ninth portion extending in a direction substantially parallel to the third portion.

In another exemplary embodiment, the first domain partitioning member includes a tenth portion extending from the eighth portion and an eleventh portion extending from the ninth portion, and the tenth portion and the eleventh portion extend in a direction substantially perpendicular to the gate line.

In another exemplary embodiment, the first domain partitioning member is a protrusion disposed on the common electrode and the second domain partitioning member is an aperture of the pixel electrode In another exemplary embodiment, a liquid crystal display includes; a first substrate, a gate line disposed on the first substrate, a pixel electrode disposed on the first substrate, a second substrate facing the first substrate, a common electrode disposed on the second substrate, a first domain partitioning member disposed on one of the first substrate and the second substrate and including a first portion disposed in a direction substantially parallel to the gate line, a second portion obliquely extending from an end of the first portion, and a third portion obliquely extending from the end of the first portion, and a second domain partitioning member disposed on one of the first substrate and the second substrate and including a fourth portion disposed in a direction substantially parallel to the gate line, a fifth portion disposed in a direction substantially parallel to the second portion, and a sixth portion disposed in a direction substantially parallel to the third portion.

In another exemplary embodiment, the first domain partitioning member includes a seventh portion extending in a direction substantially parallel to the second portion and an eighth portion extending in a direction substantially parallel to the third portion.

In another exemplary embodiment, the first domain partitioning member includes a ninth portion extending from the seventh portion and a tenth portion extending from the eighth portion, and the ninth portion and the tenth portion extend in a direction substantially perpendicular to the gate line.

In another exemplary embodiment, the ninth and the tenth portions overlap at least one edge of the pixel electrode.

In another exemplary embodiment, the first domain partitioning member and the second domain partitioning member are alternately disposed along an axis of the pixel electrode.

In another exemplary embodiment, the first domain partitioning member is a protrusion disposed on the common electrode and the second domain partitioning member is an aperture of the pixel electrode.

In another exemplary embodiment, the first domain partitioning member and the second domain partitioning member are alternately disposed along an axis of the pixel electrode.

In another exemplary embodiment, the first domain partitioning member is a protrusion disposed on the common electrode and the second domain partitioning member is an aperture of the pixel electrode.

In another exemplary embodiment, the first portion and the fourth portion are disposed substantially parallel to one another along a straight line.

In another exemplary embodiment, a liquid crystal display includes; a first substrate, a gate line disposed on the first substrate, a pixel electrode disposed on the first substrate, a second substrate facing the first substrate, a common electrode disposed on the second substrate, a first domain partitioning member disposed on one of the first substrate and the second substrate and including a first portion extending in a direction substantially oblique to the gate line and a second portion obliquely extending from an end of the first portion, and a second domain partitioning member disposed on one of the first substrate and the second substrate and including a third portion disposed in a direction substantially parallel to the gate line, a fourth portion disposed in a direction substantially parallel to the first portion, and a fifth portion disposed in a direction substantially parallel to the second portion.

In another exemplary embodiment, the first domain partitioning member includes a sixth portion extending from the first portion and a seventh portion extending from the second portion, and the sixth portion and the seventh portion extend in a direction substantially perpendicular to the gate line.

In another exemplary embodiment, the first domain partitioning member includes an eighth portion extending in a direction substantially parallel to the first portion and a ninth portion extending in a direction substantially parallel to the second portion.

In another exemplary embodiment, the first domain partitioning member includes a tenth portion extending from the eighth portion and an eleventh portion extending from the ninth portion, and the tenth portion and the eleventh portion extend in a direction substantially perpendicular to the gate line.

In another exemplary embodiment, the tenth and the eleventh portions overlap at least one edge of the pixel electrode.

In another exemplary embodiment, the sixth and the seventh portions overlap at least one edge of the pixel electrode.

In another exemplary embodiment, the first domain partitioning member and the second domain partitioning member are alternately disposed along an axis of the pixel electrode.

In another exemplary embodiment, the first domain partitioning member is a protrusion disposed on the common electrode and the second domain partitioning member is an aperture of the pixel electrode.

In another exemplary embodiment, the first domain partitioning member includes an eighth portion extending in a direction substantially parallel to the first portion and a ninth portion extending in a direction substantially parallel to the second portion.

In another exemplary embodiment, the first domain partitioning member includes a tenth portion extending from the eighth portion and an eleventh portion extending from the ninth portion, and the tenth portion and the eleventh portion extend in a direction substantially perpendicular to the gate line.

In another exemplary embodiment, the tenth and the eleventh portions overlap at least one edge of the pixel electrode.

In another exemplary embodiment, the first domain partitioning member and the second domain partitioning member are alternately disposed along an axis of the pixel electrode.

In another exemplary embodiment, the first domain partitioning member is a protrusion disposed on the common electrode and the second domain partitioning member is an aperture of the pixel electrode.

In another exemplary embodiment, the first domain partitioning member and the second domain partitioning member are alternately disposed along an axis of the pixel electrode.

In another exemplary embodiment, the first domain partitioning member is a protrusion disposed on the common electrode and the second domain partitioning member is an aperture of the pixel electrode.

In another exemplary embodiment, a liquid crystal display includes; a first substrate, a gate line disposed on the first substrate, a pixel electrode disposed on the first substrate, a second substrate facing the first substrate, a common electrode disposed on the second substrate, a first domain partitioning member disposed on one of the first substrate and the second substrate and including a first portion disposed in a direction substantially parallel to the gate line, a second portion obliquely extending from an end of the first portion, a third portion obliquely extending from the end of the first portion, a fourth portion extending from the second portion, and a fifth portion extending from the third portion, wherein the fourth portion and the fifth portion extend in a direction substantially perpendicular to the gate line, and a second domain partitioning member disposed on one of the first substrate and the second substrate and including a sixth portion disposed in a direction substantially parallel to the gate line, a seventh portion disposed in a direction substantially parallel to the second portion, and an eighth portion disposed in a direction substantially parallel to the third portion.

In another exemplary embodiment, the fourth and the fifth portions overlap at least one edge of the pixel electrode.

In another exemplary embodiment, the first domain partitioning member includes a ninth portion extending in a direction substantially parallel to the second portion and a tenth portion extending in a direction substantially parallel to the third portion.

In another exemplary embodiment, the first domain partitioning member includes an eleventh portion extending from the ninth portion and a twelfth portion extending from the tenth portion, and the eleventh portion and the twelfth portion extend in a direction substantially perpendicular to the gate line.

In another exemplary embodiment, the eleventh and the twelfth portions overlap at least one edge of the pixel electrode.

In another exemplary embodiment, the first domain partitioning member and the second domain partitioning member are alternately disposed along an axis of the pixel electrode.

In another exemplary embodiment, the first domain partitioning member is a protrusion disposed on the common electrode and the second domain partitioning member is an aperture of the pixel electrode.

In another exemplary embodiment, the first domain partitioning member and the second domain partitioning member are alternately disposed along an axis of the pixel electrode.

In another exemplary embodiment, the first domain partitioning member is a protrusion disposed on the common electrode and the second domain partitioning member is an aperture of the pixel electrode.

In another exemplary embodiment, the first portion and the eleventh portion are disposed substantially parallel to one another along a straight line.

In another exemplary embodiment, a liquid crystal display includes; a first substrate, a gate line disposed on the first substrate, a pixel electrode disposed on the first substrate, a second substrate facing the first substrate, a common electrode disposed on the second substrate, a first domain partitioning member disposed on the common electrode and including a first protrusion, a second protrusion and a third protrusion, wherein the first protrusion includes a first portion disposed in a direction substantially parallel to the gate line, a second portion obliquely extending from an end of the first portion, a third portion obliquely extending from the end of the first portion, a fourth portion extending from the second portion, and a fifth portion extending from the third portion, the second protrusion includes a sixth portion extending in a direction substantially parallel to the second portion, and a seventh portion extending from the sixth portion, and the third protrusion includes an eighth portion extending in a direction substantially parallel to the third portion, and a ninth portion extending from the eighth portion, and a second domain partitioning member disposed on the pixel electrode and including at least one apertures, wherein the aperture includes a tenth portion disposed in a direction substantially parallel to the gate line, an eleventh portion disposed in a direction substantially parallel to the second portion, and a twelfth portion disposed in a direction substantially parallel to the third portion, wherein the fourth, fifth, seventh and ninth portions extend in directions substantially perpendicular to the gate line.

In another exemplary embodiment, the fourth, fifth, seventh and the ninth portions overlap at least one edge of the pixel electrode.

In another exemplary embodiment, the first portion and the tenth portion are disposed substantially parallel to one another along a straight line.

In another exemplary embodiment, the second portion and the third portion form a wedge shape.

BRIEF DESCRIPTION OF THE DRAWINGS

FIG. 5 is a schematic sectional view of a VATN LCD according to the third to the tenth embodiments of the present invention.

FIGS. 17 and 18 are layout views of pixels in a LCD having patterns for forming multi-domains according to the ninth and the tenth embodiments of the present invention, respectively.

DETAILED DESCRIPTION OF THE INVENTION

Figure 1A:
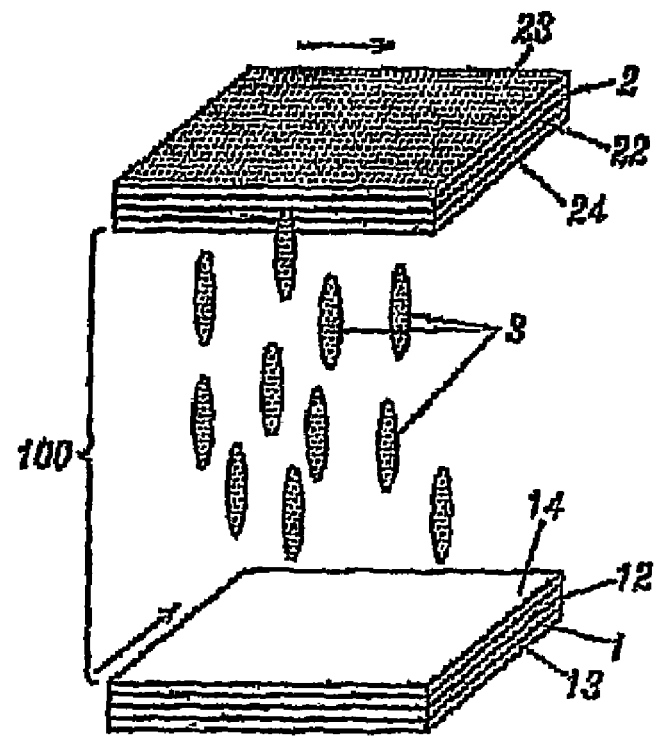
FIGS. 1A and 1B are schematic diagrams of a VATN LCD respectively in a black state and a white state according to the present invention.

The present invention now will be described more fully hereinafter with reference to the accompanying drawings, in which preferred embodiments of the invention are shown. This invention may, however, be embodied in many different forms and should not be constructed as limited to the embodiments set forth herein; rather, these inventions are provided so that this disclosure will be thorough and complete, and will fully convey the scope of the invention to those skilled in the art. In the drawings, the thickness of layers and regions are exaggerated for clarity. Like numbers refer to like elements throughout. It will be understood that when an element such as a layer, region or substrate is referred to as being "on" another element, it can be directly on the other element or intervening elements may also be present.

Figure 1B:
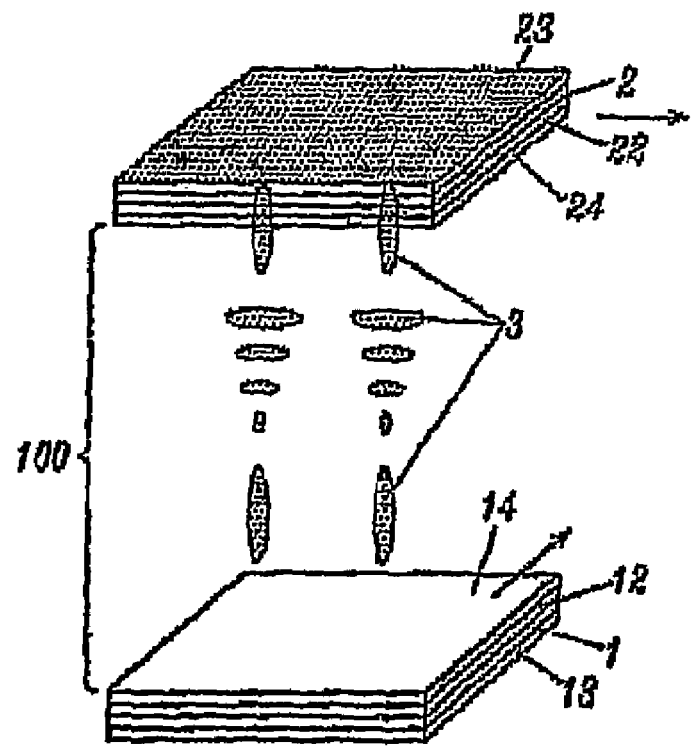

FIGS. 1A and 1B are schematic diagrams showing the alignment of the liquid crystal molecules of a VATN LCD respectively in a black state and a white state, according to the present invention.

As shown in FIGS. 1A and 1B, two glass or quartz substrates 1 and 2 are spaced apart from each other. On the inner surfaces of the substrates 1 and 2, transparent electrodes 12 and 22 made of a transparent conductive material such as ITO (indium tin oxide) or the like are formed respectively, and homeotropic or vertical alignment layers 14 and 24 are formed thereon respectively. Between the substrates 1 and 2, a liquid crystal layer 100 including a chiral nematic liquid crystal material having negative dielectric anisotropy is disposed. Instead of the chiral nematic liquid crystal, a nematic liquid crystal mixed with chiral dopants may be used. On the outer surfaces of the substrates 1 and 2, polarizers 13 and 23 are attached. The polarizers 13 and 23 polarize the rays incident on the liquid crystal layer 100 and the rays out of the liquid crystal layer 100, respectively. The polarizing directions of the polarizers 13 and 23, represented as arrows in FIGS. 1A and 1B, are perpendicular to each other. The alignment layers 14 and 24 may be rubbed or not.

FIG. 1A shows the off state when an electric field is not applied. The long axes or the molecular axes of the liquid crystal molecules 3 in the liquid crystal layer 100 are aligned perpendicular to the surface of the substrates 1 and 2 by the aligning force of the alignment layers 14 and 24.

The polarized light by the polarizer 13 attached to the lower substrate 1 passes through the liquid crystal layer 100 without changing its polarization. Then, the light is blocked by the polarizer 23 attached to the upper substrate 2 to make a black state.

FIG. 1B shows the on state when a sufficient electric field is applied to the liquid crystal layer 100. The liquid crystal molecules 3 in the liquid crystal layer 100 are twisted spirally by 90° from the lower substrate 1 to the upper substrate 2, and the director of the liquid crystal layer 100 varies continuously. However, near the inner surfaces of two substrates 1 and 2, since the aligning force of the alignment layers 14 and 24 is larger than the force due to the applied electric field, the liquid crystal molecules stay vertically aligned.

The polarized light by the polarizer 13 passes through the liquid crystal layer 100, and its polarization is rotated by 90° according to the variation of the director of the liquid crystal layer 100. Therefore, the light passes through the polarizer 23 to make a white state.

The LCD shown in FIGS. 1A and 1B is a basic structure of the following embodiments of the present invention.

The basic structures and the principles for compensating the viewing angle according to the embodiments of the present invention are described with reference to FIGS. 2, 3A and 3B. Here, the liquid crystal layer is assumed to be chiral nematic or nematic mixed with chiral dopants, and to have negative anisotropy.

Figure 2:
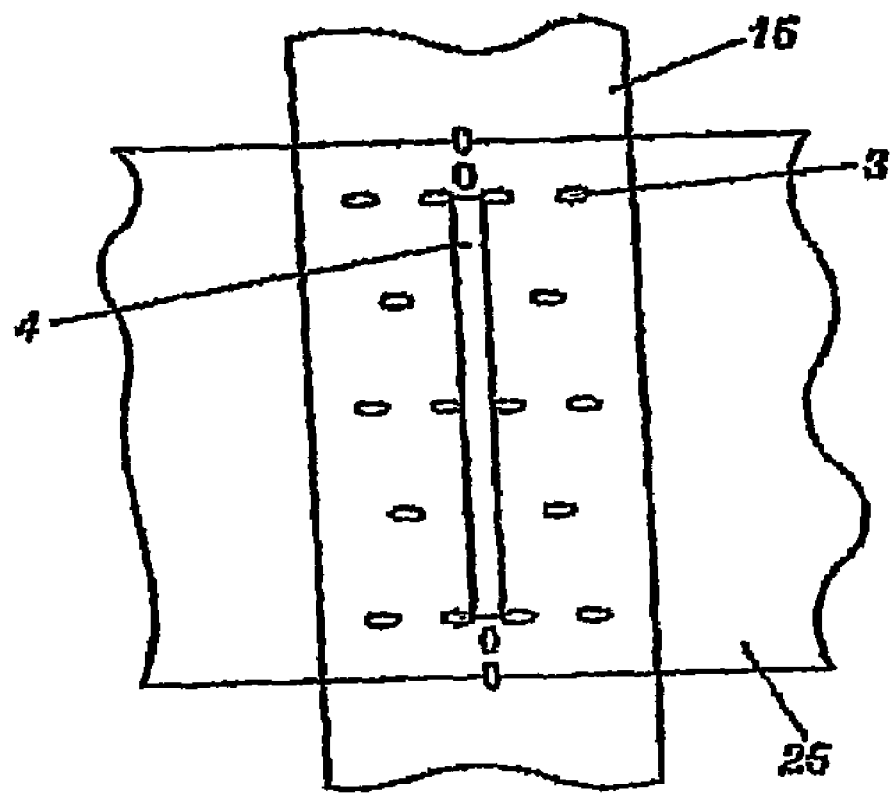
FIG. 2 is a layout view of the pattern for forming multi-domains according to the present invention.
Figure 3A:
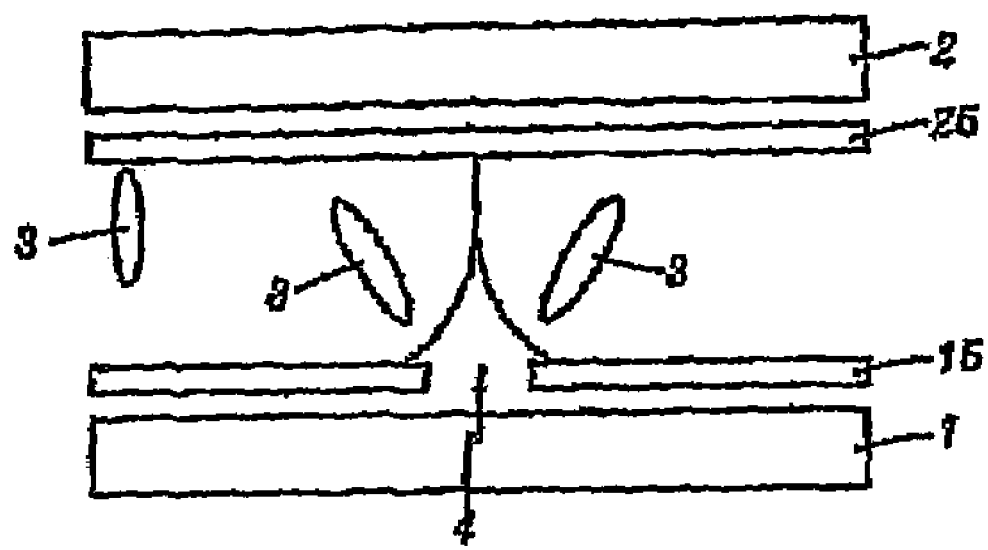
FIGS. 3A and 3B are schematic sectional views of VATN LCDs according to the present invention.

FIG. 2 is a layout view of a VATN LCD having an aperture for forming multi-domains, and FIG. 3A is a sectional view of a VATN LCD showing the structure of the electrodes and the alignment of the liquid crystal molecules according to the present invention. FIGS. 2 and 3A show only a few elements for simplicity and, therefore, the elements such as polarizers, etc., are eliminated.

As shown in FIG. 2 and FIG. 3A, an ITO electrode 15 formed on a lower substrate 1 has a linear aperture 4 extending in a horizontal direction. Although the aperture 4 has a linear shape, it actually has a width. The lower substrate 1 is opposite an upper substrate 2 having a transparent common electrode 25 thereon. A liquid crystal layer composed of liquid crystal molecules 3 is interposed between two substrates 1 and 2.

In absence of electric field, the liquid crystal molecules 3 are vertically aligned to show the black state under crossed-polarizers (not shown). When voltages are applied to the electrodes 15 and 25, an electric field is generated in the liquid crystal layer due to the voltage difference between the electrodes 15 and 25. The field direction in most regions between the electrodes 15 and 25 is perpendicular to the substrates 1 and 2. However, near the aperture 4 of the ITO electrode 15, the electric field is curved and not completely perpendicular to the substrates 1 and 2. The electric field near the aperture 4 is called the fringe field, and the fringe field is symmetrical with respect to the aperture 4.

Since the long axes of the liquid crystal molecules 3 tend to be perpendicular to the field direction, the long axes of the liquid crystal molecules 3 near the aperture 4 are tilted symmetrically in opposite directions with respect to the aperture 4. In addition, the molecular axes tend to twisted on going from the upper substrate 2 to the lower substrate 1. As a result, two domains having opposite tilt directions of the liquid crystal molecules 3 are formed at both sides of the aperture 4, and may compensate the viewing angle.

The substitution of the aperture 4 with a protrusion having a symmetrical cross section may give a similar effect, which will be described next.

Figure 3B:
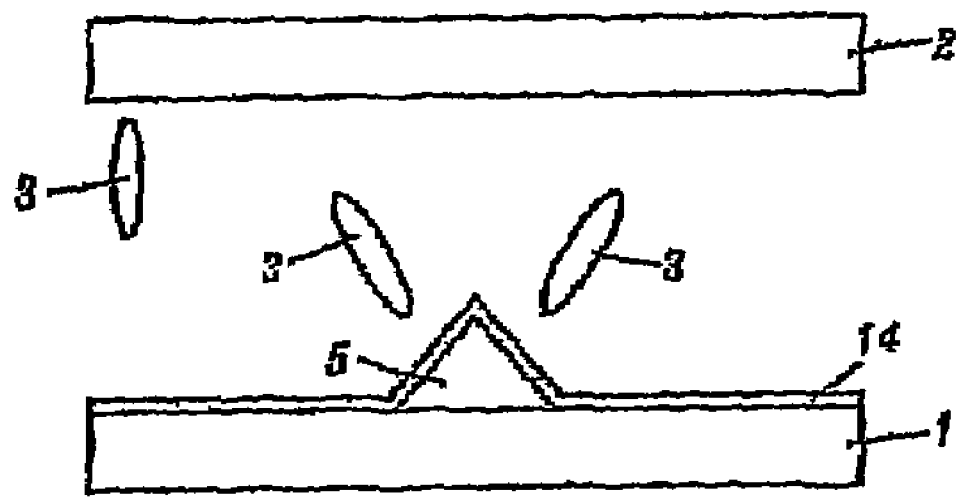

FIG. 3B is a sectional view of a VATN LCD having a protrusion according to the present invention. The layout view of the LCD is similar to FIG. 2 except the numeral 4, which may be assumed to be a protrusion.

As shown in FIG. 3B, a linear protrusion 5 having a wedge-shaped cross section is formed on a lower substrate 1 and extends in a horizontal direction. Although the protrusion 5 has a linear shape, it actually has a width. A vertical alignment layer 14 is formed thereon. A lower substrate 1 is opposite an upper substrate 2, and a liquid crystal layer including liquid crystal molecules 3 is interposed between the substrates 1 and 2.

In the absence of an electric field, the liquid crystal molecules 3 near the protrusion 5 are perpendicular to the surface of the protrusion 5 since the liquid crystal molecules 3 tend to erect perpendicularly to the surface of the alignment layer 14 by the aligning force of the alignment layer 14. Since the cross section of the protrusion 5 is symmetrical, the molecules 3 are symmetrically arranged with respect to the protrusion 5. Therefore, two domains having opposite tilt directions with respect to the protrusion 5 are generated at the both sides of the protrusion 5 even in the off state.

When an electric field is applied between the substrates 1 and 2, the liquid crystal molecules 3 in the two domains are tilted in opposite directions and tend to be horizontally arranged to the substrates 1 and 2.

However, the molecules 3 near the surface of the upper substrate 2 where the apertures or protrusions do not exist and near a central region between the apertures 4 or the protrusions 5, which are far from the apertures 4 or the protrusions 5, may not be affected by the electric field near the apertures 4 or the protrusions 5. The arrangement of the molecules 3 in the region may not be so uniform and the response time may not be so short. Therefore, it will be described that the patterns such as apertures or protrusions are provided in both substrates 1 and 2.

Figure 4A:
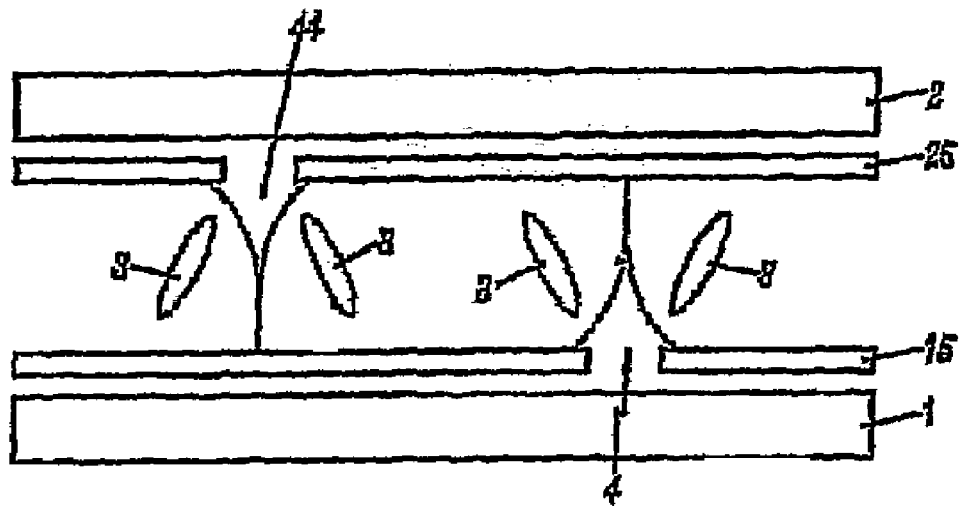
FIGS. 4A and 4B are schematic sectional views of VATN LCDs according to the first and the second embodiments of the present invention, respectively.
Figure 4B:
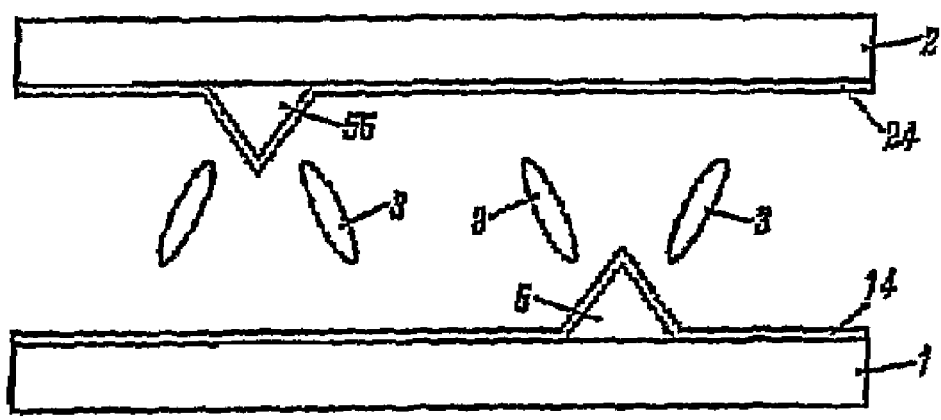

FIGS. 4A and 4B are cross sectional views of LCDs according to the first and the second embodiments of the present invention, respectively.

As shown in FIG. 4A, an ITO electrode 15 formed on a lower substrate 1 has a linear aperture 4 and a common electrode 25 formed on an upper substrate 2 opposite the lower substrate 1 also has a linear aperture 44. A liquid crystal layer composed of liquid crystal molecules 3 are interposed between the substrates 1 and 2. The aperture 44 extends parallel to and is spaced apart from the aperture 4 when viewed from the top.

The fringe fields due to both the apertures 4 and 44 make the molecules in a region between adjacent apertures 4 and 44 to incline in the same direction. Therefore, the liquid crystal molecules 3 in the region between the aperture 4 and the aperture 44 are aligned more uniformly and the response time becomes reduced.

Next, as shown in FIG. 4B, a linear protrusion 5 having a wedge-shaped cross section is formed on a lower substrate 1 and a vertical alignment layer 14 is formed thereon. A linear protrusion 55 having a wedge-shaped cross section is formed on an upper substrate 2 opposite the lower substrate 1, and a vertical alignment layer 24 is formed thereon. The protrusions 5 and 55 are parallel to and spaced apart from each other when viewed from the top. A liquid crystal layer including liquid crystal molecules 3 is interposed between the substrates 1 and 2 and the liquid crystal molecules 3 are perpendicular to the surfaces of the alignment layers 14 and 24 by the aligning force of the alignment layers 14 and 24.

As similar to the first embodiment, the molecules in a region between adjacent protrusions 5 and 55 are inclined in the same direction by the protrusions S and 55. Therefore, the liquid crystal molecules 3 in the region between the protrusions 5 and 55 are aligned more uniformly and the response time becomes reduced.

However, the LCDs of the first and the second embodiments may have some problems.

The number of the manufacturing steps of the LCD shown in FIG. 4A and FIG. 4B increases, as described below.

First, if the upper substrate 2 shown in FIG. 4A has color filters under the common electrode 25, while wet etch of the common electrode 25 are performed by using ITO etchant to form the apertures 4 and 44, the etchant may attack or contaminate the color filter. Therefore, a passivation film made of organic or inorganic material should be interposed between the color filter and the ITO electrode. Therefore, the step of forming the passivation film may be added.

Second, of the LCD shown in FIG. 4B, the step of forming the protrusions 5 and 55 may be added.

In addition, the light leakage may be yielded near the protrusions 5 and 55, since the long axes of the liquid crystal molecules 3 near the protrusions 5 and 55 are not perpendicular to the substrates 1 and 2 in the off state. Accordingly, brightness in dark state increases and the contrast ratio decreases.

Now, in order to solve these problems, LCDs according to the third to the tenth embodiments are described.

FIG. 5 shows a cross sectional view of a vertically aligned liquid crystal display having multi-domains according to the third to the tenth embodiments of the present invention. The liquid crystal layers in the embodiments are interposed between an upper substrate and a lower substrate and are composed of liquid crystal material having negative anisotropy and chirality.

As shown in FIG. 5, a linear aperture 270 is formed in an ITO pixel electrode 200 on the inner surface of a lower insulating substrate 10, and a vertical alignment film 240 is coated thereon. A black matrix 110 is formed on a color filter 120 and the black matrix is formed on the inner surface of an upper insulating substrate 20 facing the lower substrate 10. A plurality of linear protrusions 170 are formed on the black matrix 110, and a vertical alignment film 140 is coated thereon. The upper and lower substrates 20 and 10 are arranged in a manner that the protrusions 170 and the aperture 270 are alternately arranged. A liquid crystal layer having negative dielectric anisotropy is interposed between the two substrates 10 and 20 and vertically aligned to the surfaces of the substrates 10 and 20 by the vertical alignment film 240 and 140.

Furthermore, polarizers 13 and 23 are attached on the outer surfaces of the assembled substrates 10 and 20. The polarizing axes of the polarizers 13 and 23 are perpendicular to each other.

Compensation films 133 and 233 are interposed between polarizer 13 and 23 and the substrates 20 and 200 respectively. One of the compensation films may be an a-plate compensation film and the other a c-plate compensation film. Otherwise, both the compensation films may be c-plate compensation films. A biaxial compensation film may be used instead of the uniaxial compensation film, and, in this case, the biaxial compensation film may be attached to only one substrate. The slow axis, which is the direction having a largest refractive index, of the a-plate or the biaxial compensation film may be parallel or perpendicular to the polarizing directions of the polarizers 13 and 23.

Here, since the protrusions 170 are formed only on the substrate 20, the light leakage near the protrusions 170 decreases compared with the second embodiment.

Furthermore, since the protrusions 170 are formed on the color filter 120 and it is not necessary to etch the common electrode (not shown), the manufacturing process of the color filter substrate is simple compared with the first embodiment. In addition, since the lower substrate does not have protrusions, the manufacturing process of the lower substrate is simple compared with the second embodiment.

The manufacturing method of the LCD will be described in detail later.

The LCD shown in FIG. 5 may have various layouts, which will be described in the third to the tenth embodiments.

The third to the tenth embodiments of the present invention are related to liquid crystal displays (LCDs) having patterns for forming four domains in a pixel region.

Figure 6:
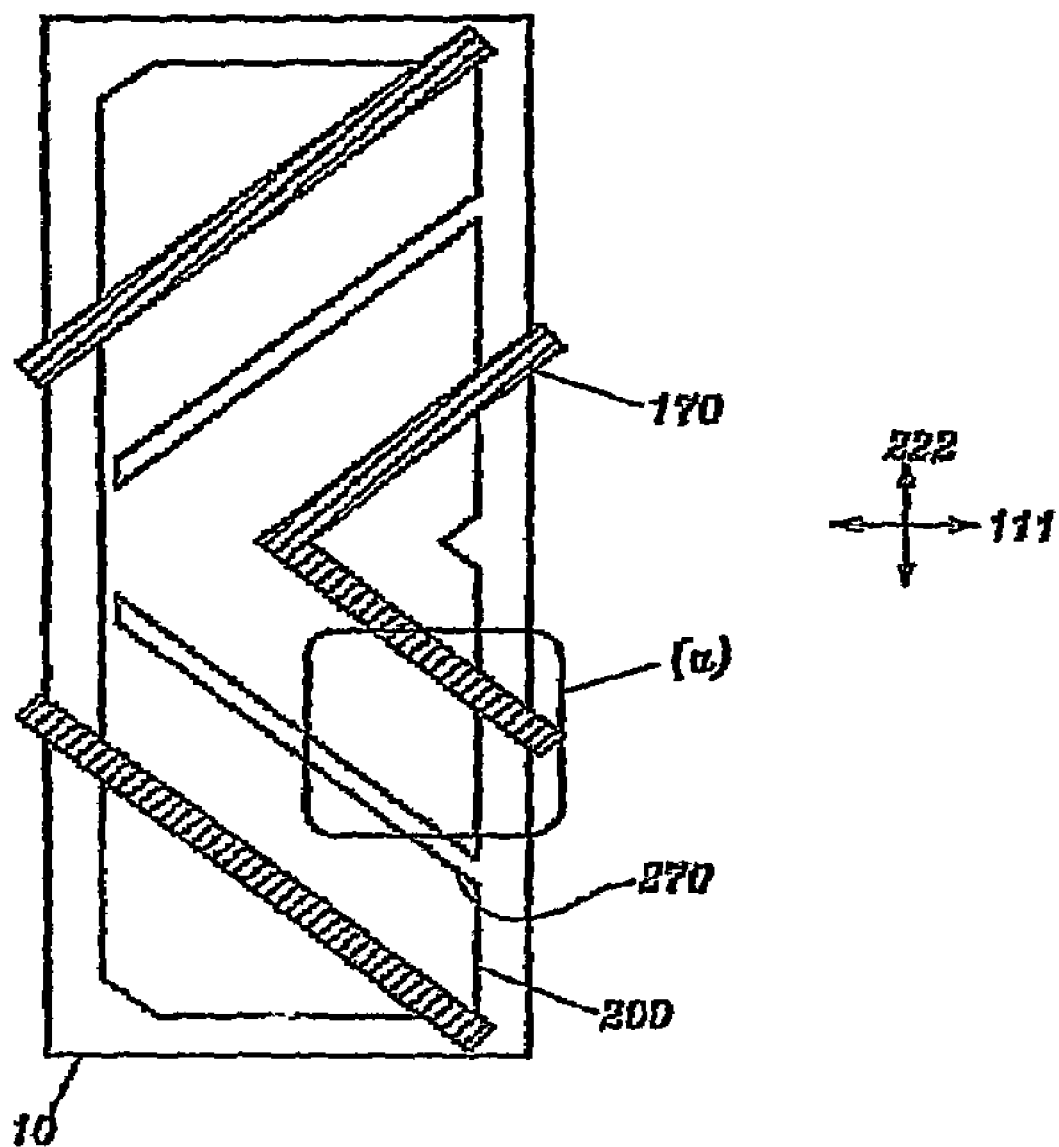
FIG. 6 is a layout view of a pixel in a VATN LCD having patterns for forming multi-domains according to the third embodiment of the present invention.

Now, the third embodiment of the present invention will be described with reference to FIG. 6 showing a pixel having patterns for four domains.

A protrusion pattern including a plurality of linear protrusions 170 formed on a color filter substrate and an aperture pattern including a plurality of linear apertures 270 formed in a pixel electrode 200 on a TFT substrate 10 have substantially wedge shapes having bent portions placed on the transverse center line passing through the center of a pixel. The protrusions 170 and the apertures 270 are arranged alternately, and are parallel to each other in respective half portions located at upper and lower sides of the transverse center line.

The liquid crystal molecules in adjacent two regions divided by the aperture 270 or the protrusion 170 either in the upper half portion or in the lower half portion have opposite tilt directions. Therefore, two domains are obtained in each half portion.

Furthermore, the liquid crystal molecules in the upper half portion and in the lower half portion have different tilt directions. Therefore, four domains having different tilt directions are obtained in a single pixel to enlarge the viewing angle more than the first and the second embodiments.

The apertures 270 and the protrusions 170 are formed at an angle of 45 degrees with respect to the polarizing axis 111, and the long axes of the liquid crystal molecules are perpendicular to the protrusions 170 and the apertures 270. Therefore, the long axes of the liquid crystal molecules make 45 (or 135) angular degrees with the polarizing directions of the polarizing axes 111 and 222. As described above, since four domains each have different tilt directions, viewing angle is enlarged.

Figure 7:
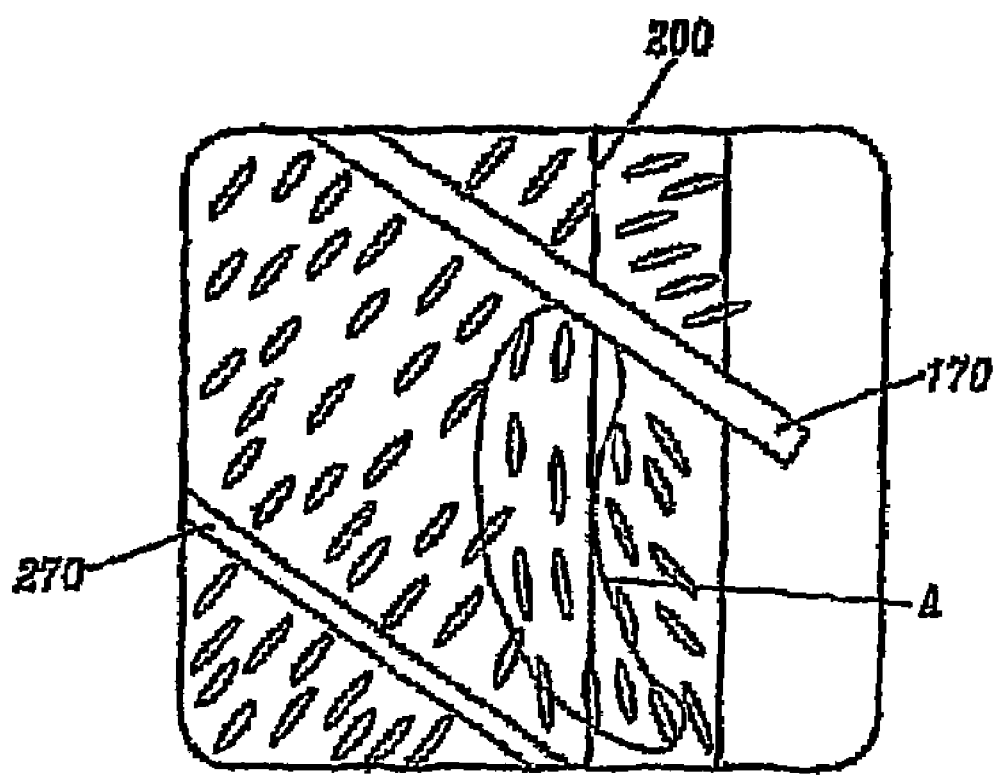
FIG. 7 is an enlarged view of a portion (a) in FIG. 6.

In this embodiment, however, the arrangement of liquid crystal molecules falls into disorder near the bent portions of the patterns 170 and 270, and disclination is generated near the position where the apertures 270 meet the boundary of the pixel electrode 200 because the angle therebetween is acute, as shown in FIG. 7 which is an enlarged layout view of portion (a) of FIG. 6. FIG. 7 shows that the arrangement of the liquid crystal molecules falls into disorder in the region A, which causes the decrease of the luminance. Moreover, the disorder of the arrangement may cause the afterimage because the disordered region may move whenever different pixel voltages are applied.

Figure 8A:
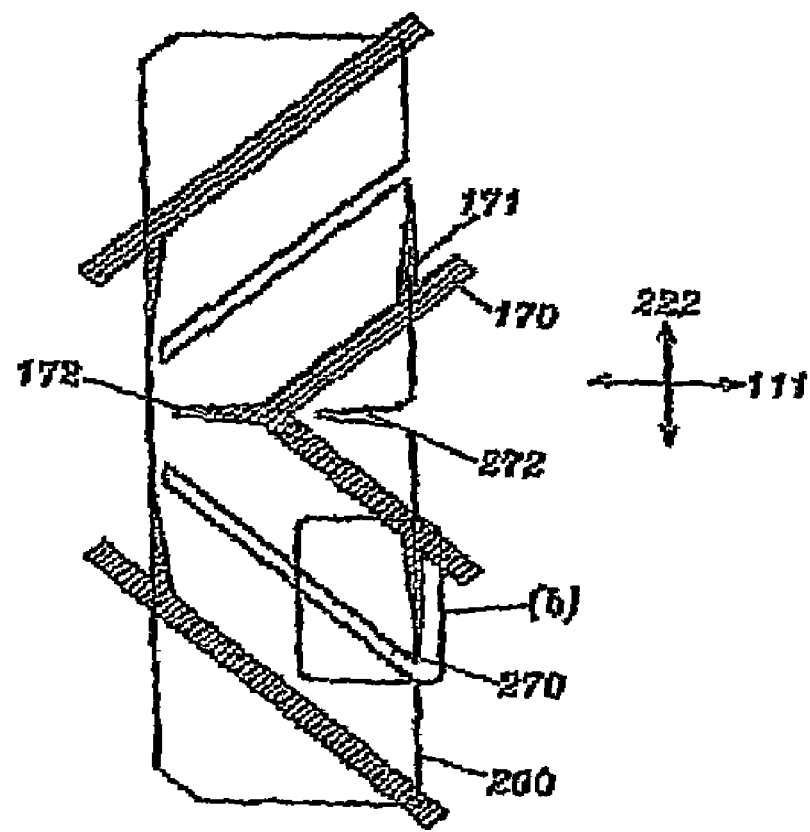
FIGS. 8A and 8B are layout views of pixels in a VATN LCD having patterns for forming multi-domains according to the fourth embodiment of the present invention.
Figure 8B:
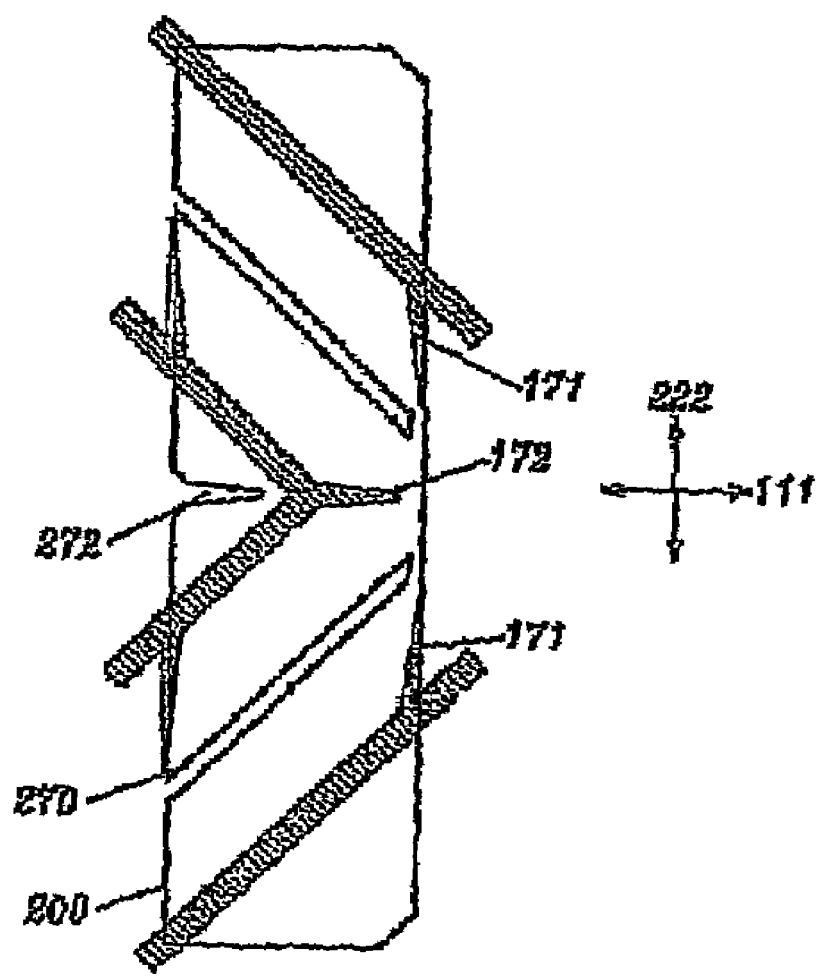

According to the fourth embodiment of the present invention shown in FIGS. 8A and 8B, the disclination generated in the third embodiment may be removed.

The shapes of the patterns are substantially similar to the patterns of the fifth embodiment. That is, a protrusion pattern 170 formed on a color filter substrate and an aperture pattern 270 formed on a TFT substrate have wedge shapes, and the protrusions 170 and the apertures 270 are arranged alternately. The bent portions of the wedge-shaped patterns are placed on the transverse center line passing through the center of a pixel, and have a convex point and a concave point.

A first branch protrusion 172 extend from the convex point of the protrusion 170 toward the concave point of the aperture 270, and a branch aperture 272 extend from the convex point of the aperture 270 toward the concave point of the protrusion 170 along the transverse center line.

Second branch protrusions 171 of the protrusion pattern 170 extend from the points where the protrusions 170 meet the edges of the pixel electrode 200 toward the points where the edges of the pixel electrode 200 and the wedge-shaped aperture pattern 270 substantially make an acute angle. Therefore, the ends of the patterns 270 and 170 formed on the two substrates are close to each other, and the patterns 270 and 170 have only obtuse angles to remove the disclination.

Figure 9:
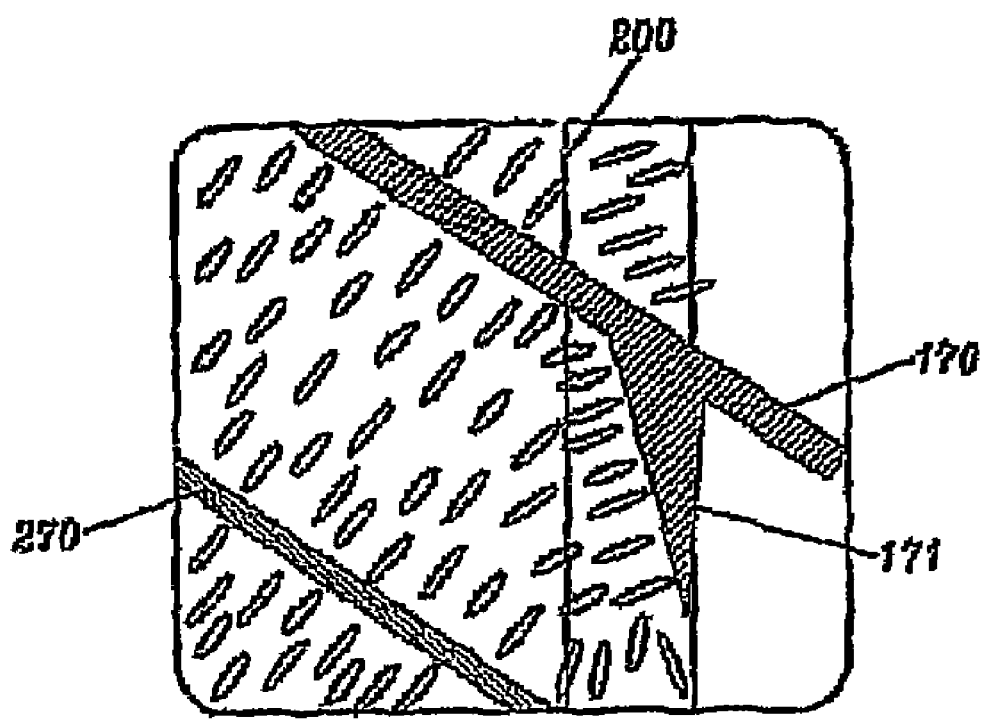
FIG. 9 is an enlarged view of a portion (b) in FIG. 8A.

That is, the liquid crystal molecules are arranged relatively in order by the branch protrusion 171 as shown in FIG. 9 which is an enlarged layout view of portion (b) of FIG. 8A.

The width of the first and the second branch protrusions 171 and 172 and the branch aperture 272 may gradually decrease from the point connected to the patterns 170 and 270 to the end of the branches 171, 172 and 272. The widths of the linear protrusions 170 and the linear apertures 270 are preferably in the range of 3 to 20 microns, and the distance therebetween are in the range of 5 to 20 microns.

In the fifth embodiment of the present invention, disclination may be prevented by a black matrix or a wire instead of forming branch patterns.

Figure 10:
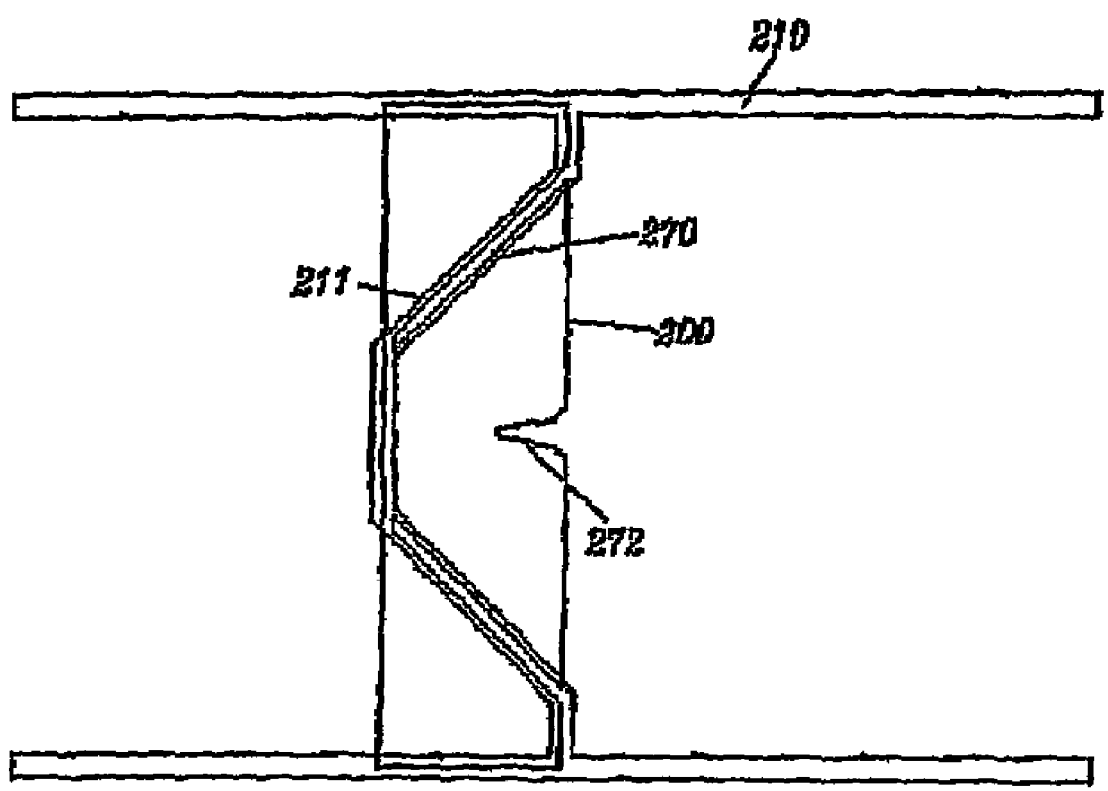
FIG. 10 is a layout view of a pixel region in a TFT substrate having a modified gate line according to the fifth embodiment of the present invention.
Figure 11:
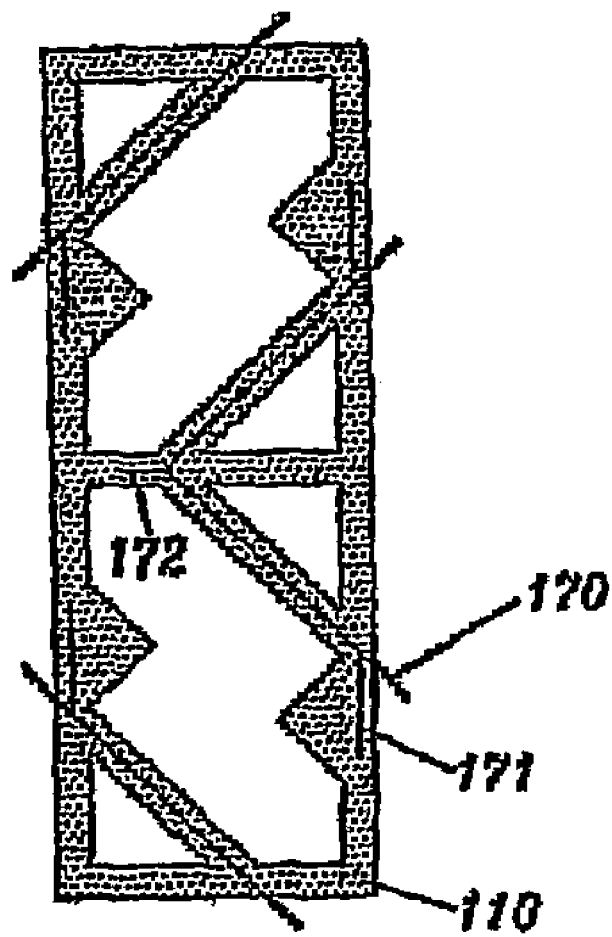
FIG. 11 is a layout view of a pixel region in a color filter substrate having a black matrix and a protrusion pattern according to the fifth embodiment of the present invention.

FIGS. 10 and 11 are layout views of a TFT substrate and a color filter substrate according to the fifth embodiment respectively.

As shown in FIG. 10, a portion 211 of a gate line 210 which transmits a scanning signal is formed to have substantially the same shape as one of the apertures 270 which has the same shapes as those in FIGS. 8A and 8B. That is, the portion 211 has a trapezoid shape without the lower side. Then, the portion 211, made of opaque metal, blocks the light from the backlight, and, therefore the light leakage or the decrease of luminance due to the aperture 270 may be removed.

Next, as shown in FIG. 11, a black matrix 110 is formed on the color filter substrate to cover the regions where disclination is generated and the protrusions 170, 171 and 172 on the color filter substrate. The disclination regions are, as described above, the regions where the apertures 270 on the TFT substrate meet the edges of the pixel electrode 200 and the region where the wedge-shaped patterns 170 and 270 are bent.

The black matrix pattern which covers the disclination includes, as shown in FIG. 11, an edge portion surrounding and defining a pixel region, a wedge-shaped portion to cover the pattern 170, a triangular portion to cover the disclination between wedge-shaped protrusions 170 and apertures 270 and a central portion put across the pixel region to cover the disclination generated in the bent portion of the patterns 170 and 270.

Then, the light leakage generated by the disclination or the patterns 170 and 270 is prevented by the black matrix 110. Moreover, additional decrease of the aperture ratio does not occur though the black matrix 110 is formed to have relatively large area because the region where the black matrix covers may not be used for display.

Figure 12:
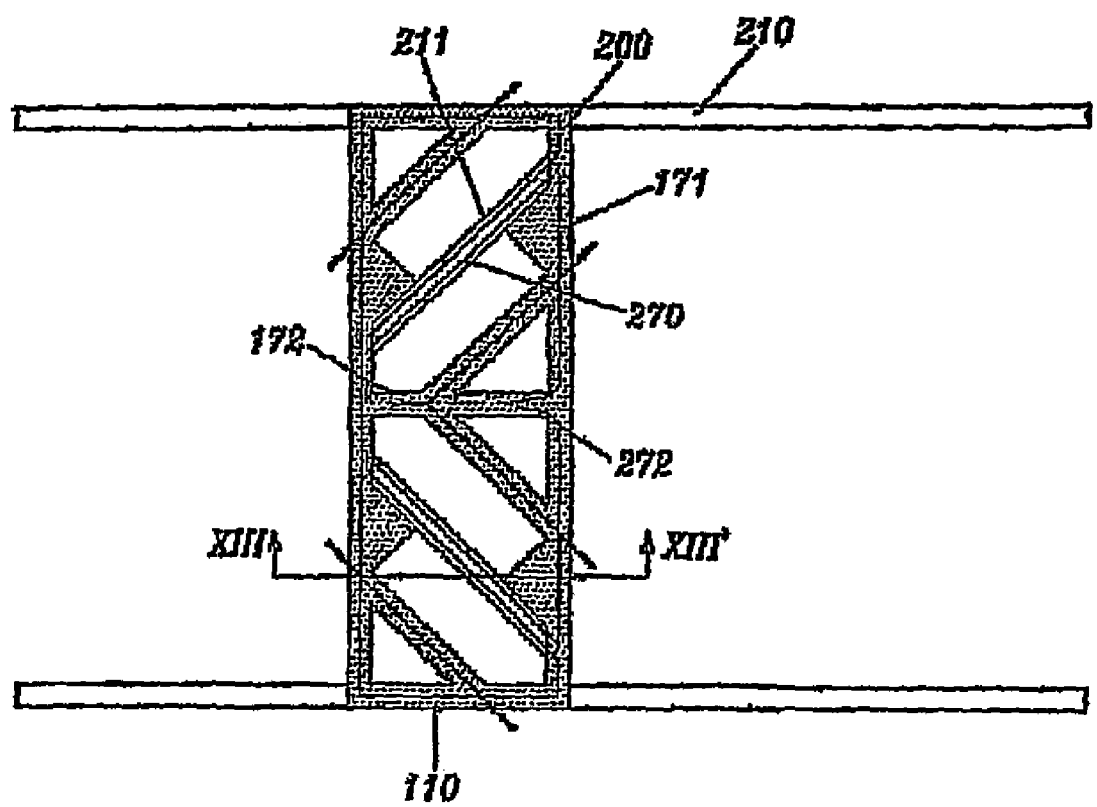
FIG. 12 is a layout view of a pixel in an LCD having the TFT substrate and the color filter substrate shown in FIGS. 10 and 11.
Figure 13:
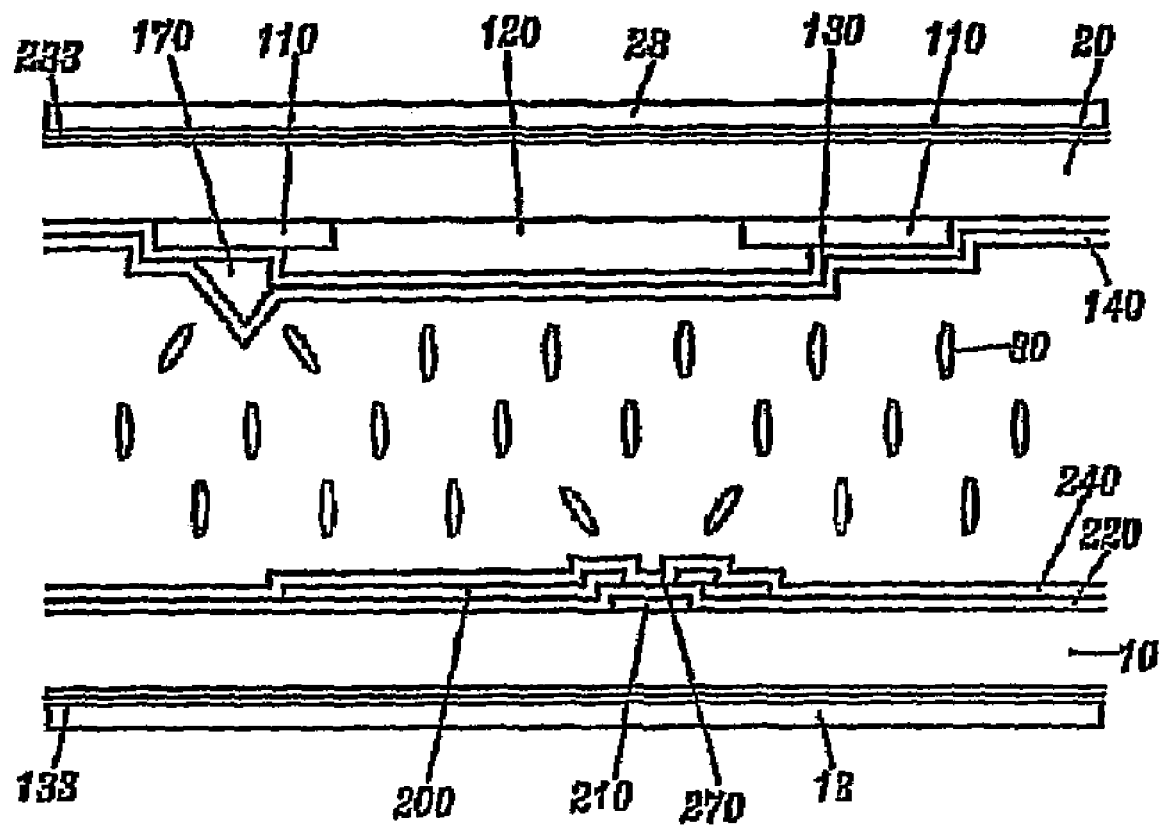
FIG. 13 is a sectional view of the LCD shown in FIG. 12 taken along the line XIII-XIII'.

FIG. 12 is a layout view of a pixel in an LCD having the TFT substrate and the color filter substrate shown in FIGS. 10 and 11. FIG. 13 is a sectional view of an LCD shown in FIG. 12 taken along the line XIII-XIII'.

As shown in FIGS. 12 and 13, a portion 211 of a gate line 210 is formed on a lower TFT substrate. The gate line 210 has a trapezoid shape without the lower side of the trapezoid. An insulating layer 220 covers the gate line 210. A pixel electrode 200 is formed on the insulating layer 220, and portions of the pixel electrode 200 are removed to form wedge-shaped aperture pattern 270 over the portion 211 of the gate line 210. A vertical alignment layer 240 is formed on the pixel electrode 200.

On the other hand, a black matrix 110 is formed on an upper color filter substrate 20 to cover the outside of the pixel electrode 200, the protrusions 170 and the disclination regions. In the pixel region within the black matrix 110, a color filter 120 is formed and an ITO common electrode 130 is formed over the color filter substrate 20. Protrusions 170 made of organic or inorganic material are formed on the common electrode 130 over the black matrix 110. The protrusions 170 formed on the upper substrate overlap the black matrix 110 and is arranged alternately to the apertures 270 formed on the lower substrate, and the protrusions 170 and the apertures 270 are parallel to each other.

Polarizers 13 and 23 may be attached to the outer surfaces of two substrates 10 and 20, and their polarizing axes are perpendicular to each other.

Compensation films 133 and 233 may be attached between one of the substrates 10 and 20 and one of the polarizers 13 and 23 attached thereto.

A liquid crystal material layer 30 with negative dielectric anisotropy is interposed between two substrates 10 and 20, and the liquid crystal molecules are homotropically aligned to the substrates 10 and 20 by the aligning force of the alignment layers 140 and 240. Near the protrusions 170, the liquid crystal molecules are aligned to be perpendicular to the surface of the protrusions 170.

Figure 14:
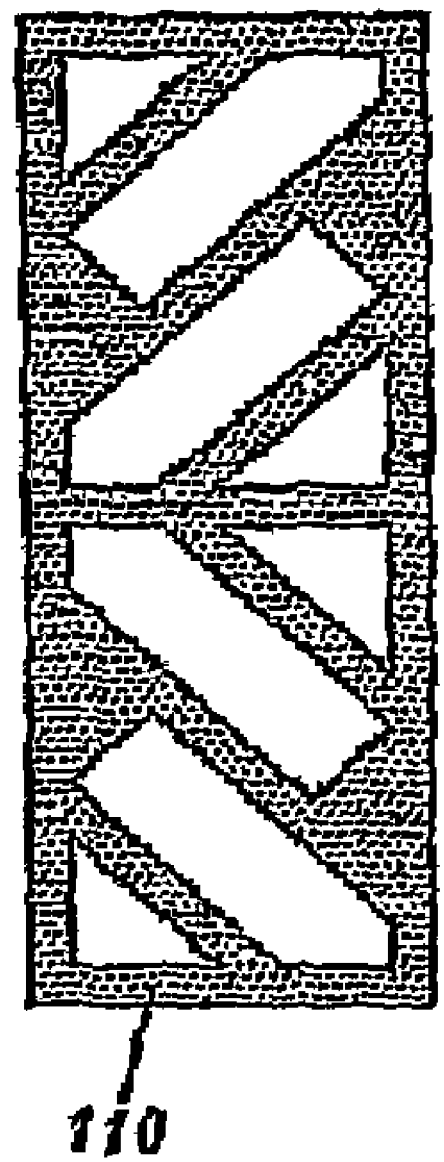
FIG. 14 is a layout view of a pixel region in a color filter substrate having a black matrix according to the sixth embodiment of the present invention.

It is possible to form a gate line as in a conventional LCD, and then the aperture pattern formed on the lower substrate is also covered by the black matrix, as shown in FIG. 14 which is a layout view of a pixel region in a color filter substrate according to the sixth embodiment of the present invention.

A black matrix 110 is formed to define a pixel region and to cover the protrusions 170 for forming multi-domains, the disclination between wedge-shaped protrusion pattern 170 and aperture pattern 270 and the disclination generated in the bent portion of the protrusion pattern 170 and the aperture pattern 270 as in the fifth embodiment. In addition, the black matrix 110 includes another portion to cover the apertures 270 formed on the lower substrate.

If the black matrix covers the patterns 170 and 270 and the disclination as in the sixth embodiment, it is not necessary to consider the influence due to the change of the gate line and no additional process step is required.

Moreover, the shape of the pixel electrode may be changed instead of forming the branches in the fourth embodiment.

Figure 15:
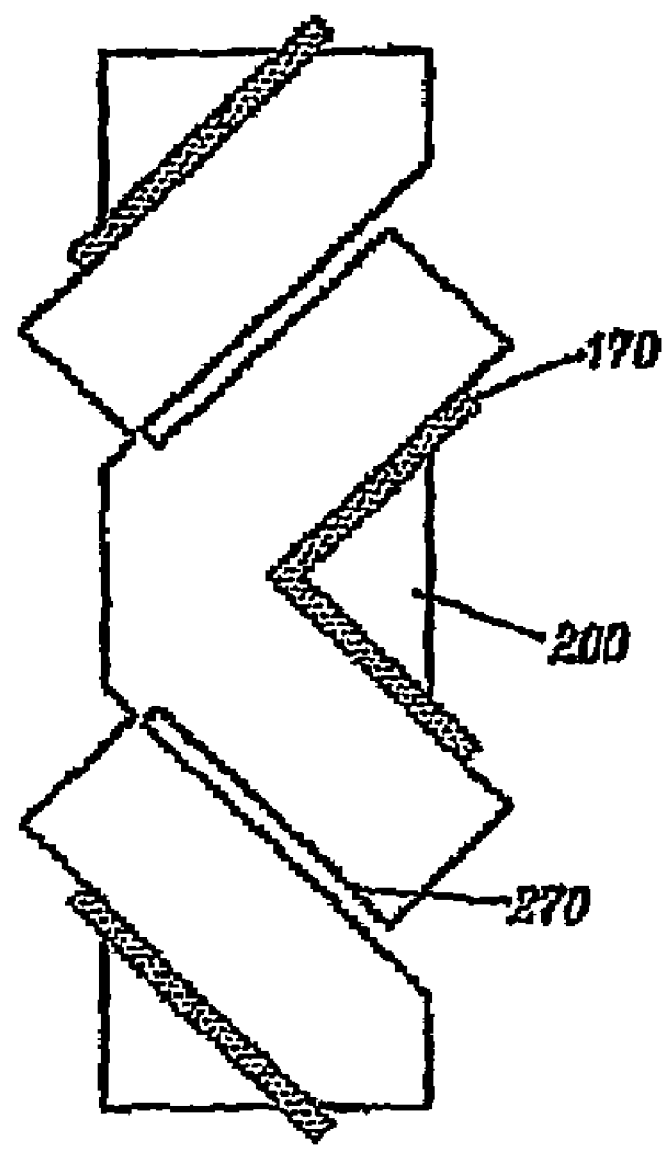
FIG. 15 is a layout view of a pixel in an LCD having a modified pixel electrode according to the seventh embodiment of the present invention.

In the seventh embodiment of the present invention shown in FIG. 15, a pixel electrode is changed to prevent from decrease of the luminance.

As described above, the region where the disclination is generated is the region where the aperture pattern 270 on the TFT substrate meets the edges of the pixel electrode 200.

Therefore, in the seventh embodiment of the present invention, the edge of the pixel electrode 200 between the apertures 270 and the protrusions 170 is perpendicular to the protrusion pattern 170. The widths of the apertures 270 and the protrusions 170 are preferably 30 to 20 microns respectively, and the distance between the patterns 170 and 270 is preferably in the range of 5 to 50 microns.

Figure 16:
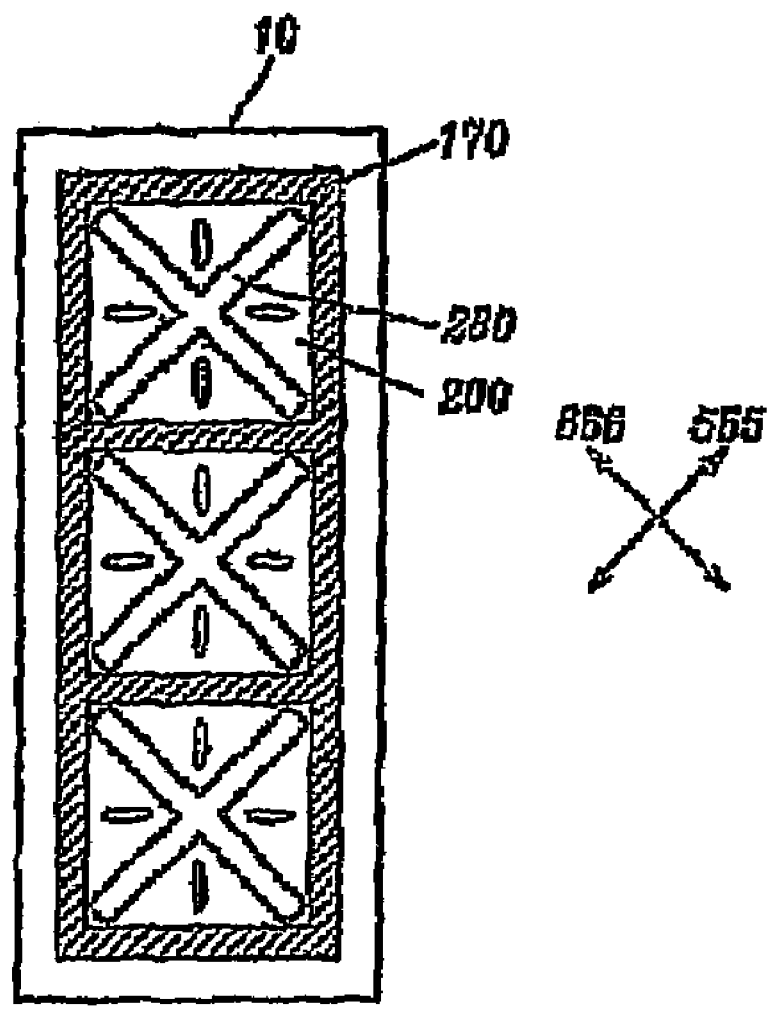
FIG. 16 is a layout view of a pixel in an LCD having patterns for forming multi-domains according to the eighth embodiment of the present invention.

The eighth embodiment having patterns for four-domains is shown in FIG. 16.

As shown in FIG. 16, an aperture pattern including a plurality of apertures 280 is formed in a pixel electrode 200 on a TFT substrate 10 and has an X shape having the first and the second portions crossing each other at a right angle. A protrusion 170 is formed of one portion corresponding to the edges of the pixel electrode 200 and the other portion transversing the spaces between the apertures 280.

The liquid crystal layer in the single pixel have four domains having different tilt directions by the apertures 280 and the protrusion 170, and the long axes of the liquid crystal molecules in the adjacent domains are arranged at an angle of 90 or 180 degrees.

It is suitable that the polarizers are attached to the substrate 10 and 20 (see FIG. 5) in a manner that polarizing directions 555 and 666 are perpendicular to each other. The polarizing directions 555 and 666 make an angle of 45 degrees with the long axes of the liquid crystal molecules.

Figure 17:
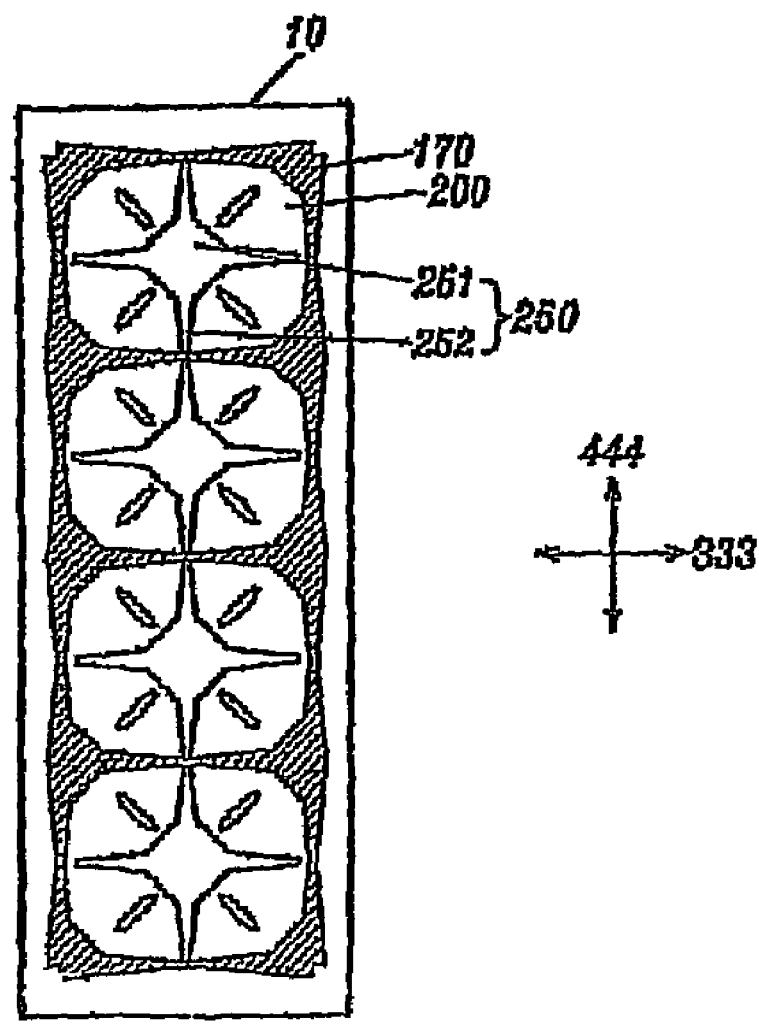
Figure 1B:
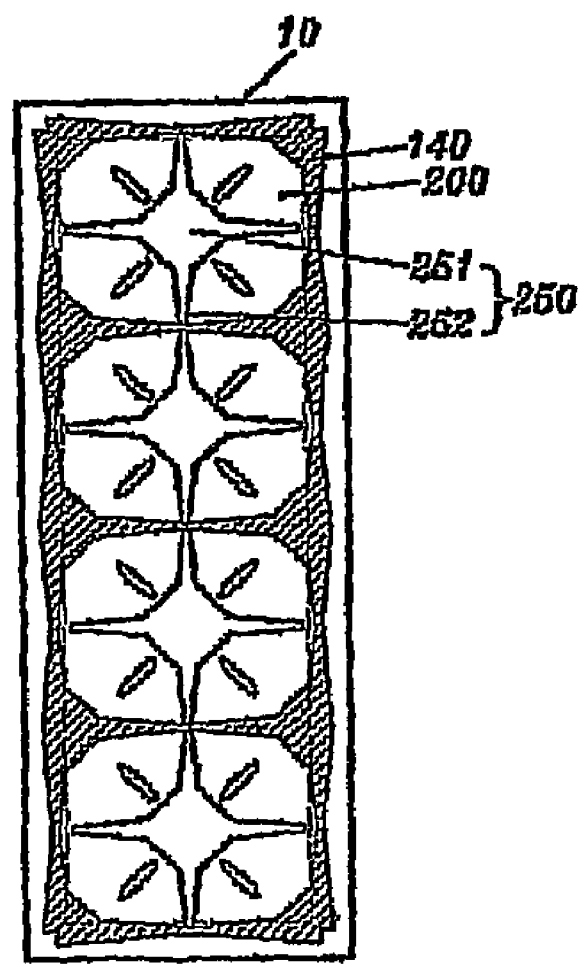

FIGS. 17 and 18 are layout views of pixels in an LCD having patterns for multi-domains according to the ninth and the tenth embodiments of the present embodiment. A protrusion pattern overlaps substantially the boundary of a pixel electrode or is located substantially inside the pixel electrode in FIG. 17, while it is substantially located outside the pixel electrode in FIG. 18.

As shown in FIGS. 17 and 18, a substantially cross-shaped aperture pattern including a plurality of apertures 250 is formed in a pixel electrode 200 on a TFT substrate 10, and a protrusion pattern 170 surrounding the cross-shaped apertures 250 is formed on a color filter substrate.

The four domains are obtained by the apertures 250 and the protrusion 170, and the long axes of the liquid crystal molecules interposing between the substrates are perpendicular to each other.

It is possible to modify the shape of the cross shapes as in FIGS. 17 and 18.

The modified cross-shaped apertures 250 includes a diamond-shaped portion 251 and extended portions 252. The extended portions 252 extend outwards from the corners of the diamond 251 and make a right angle with each other. The width of the extended portions 252 decreases gradually as they extend from the point connected to the portion 251 to the ends of the extended portions 252. Oblique sides of the diamond portion 251 are parallel to the corresponding oblique sides of protrusion 170 respectively because the protrusion pattern 170 and aperture pattern 250 have substantially the same shape as each other even though the centers of the patterns 170 and 250 are alternately arranged.

Therefore, the liquid crystal molecules between the patterns 250 and 170 are arranged relatively uniformly, and the response time is reduced.

In this case, it is suitable that polarizing directions of the polarizers on two substrates are respectively a vertical direction 444 and a horizontal direction 333 such that the long axes of the liquid crystal molecules make an angle of 45 degrees with the polarizing directions.

The widths of the patterns 170 and 250 are preferably in the range of 3 to 20 microns and the height of the protrusion pattern 170 is 0.3 to 3.0 microns. If the width is too narrow, the region where the liquid crystal molecules incline by the fringe field is too small, and therefore the effect of multi-domains is not sufficiently gained. On the contrary, if the width is too large, the aperture ratio becomes low.

The distance between the protrusion pattern 170 and the aperture pattern 250 is in the range of 10 to 50 microns. However, it depends on the size or the shape of the pixel.

For high-aperture ratio, the embodiment shown in FIG. 18 in which the protrusion pattern 170 outside the edges of the pixel electrode 200 is superior to the embodiment shown in FIG. 17 in which the protrusion pattern 170 overlaps the edges or is located inside the edges.

Next, a manufacturing method of a liquid crystal display for forming multi-domains is described.

FIG. 19A to FIG. 19E are cross sectional views of the intermediate structures of a color filter substrate when manufactured according to the embodiment shown in FIG. 5.

Figure 19A:
FIG. 19A to FIG. 19E are cross sectional views of the intermediate structures of a color filter substrate when manufactured according to the embodiment shown in FIG. 5.
Figure 19B:
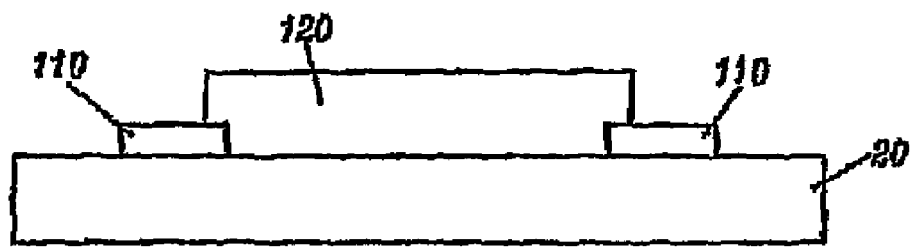

As shown in FIGS. 19A and 19B, a black matrix 110 is formed on a transparent insulating substrate 20 and a color filter 120 is formed within the black matrix 110.

Figure 19C:
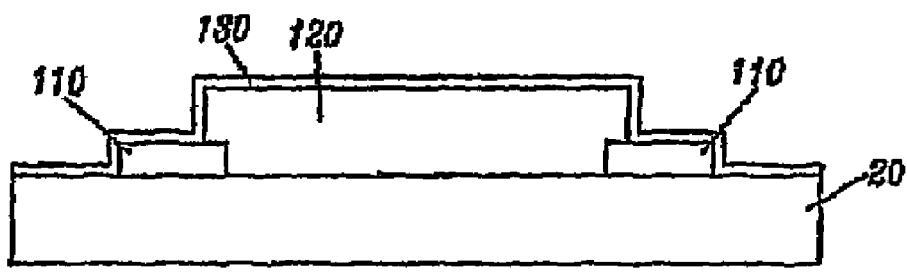

Then, as shown in FIG. 19C, an ITO layer is deposited thereon to form a common electrode 130.

Figure 19D:
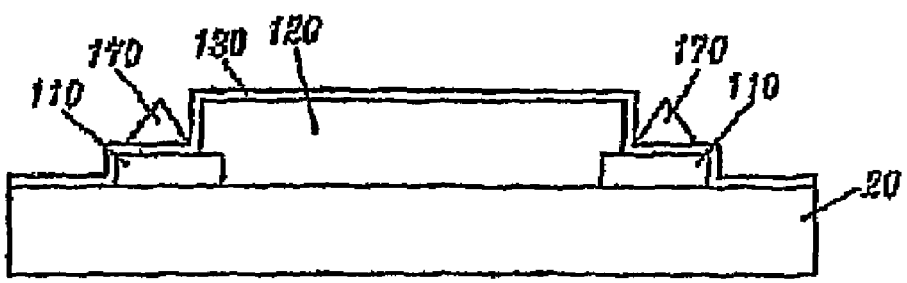
Figure 19E:
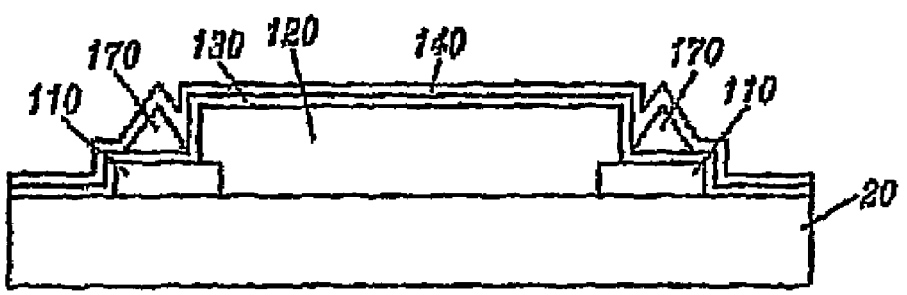

As shown in FIGS. 19D and 19E, a photo-sensitive film such as photoresist or polyimid film is coated on the common electrode 130 with the thickness of 3 to 20 microns, exposed, developed and baked to form a protrusion pattern 170 with 0.3 to 3 micron width. The protrusion pattern 170 may overlap the black matrix 110. Then, a vertical alignment layer 140 is coated thereon.

FIG. 20A to FIG. 20D are cross sectional views of the intermediate structures of a TFT substrate when manufactured according to the embodiment in FIG. 5.

As shown in FIGS. 20A to 20D, a gate wire including gate lines 210 is formed on a transparent insulating substrate 10, and a gate insulating film 220 is deposited thereon. Afterward, an active layer (not shown) and a data wire (not shown) are formed to form a TFT.

Figure 20A:
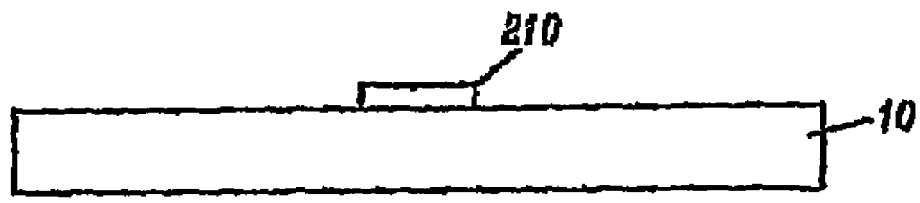
FIG. 20A to FIG. 20D are cross sectional views of the intermediate structures of a TFT substrate when manufactured according to the embodiment shown in FIG. 5.
Figure 20B:
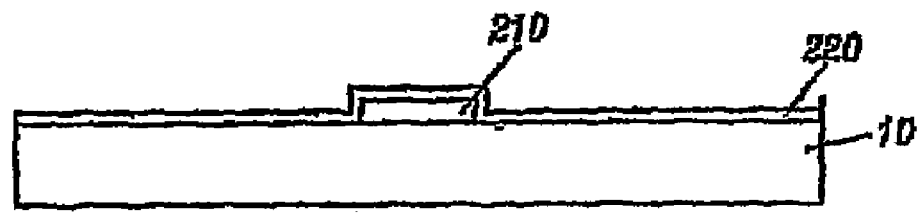
Figure 20C:
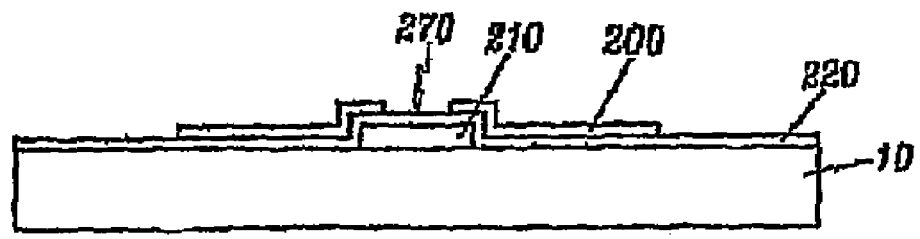
Figure 20D:
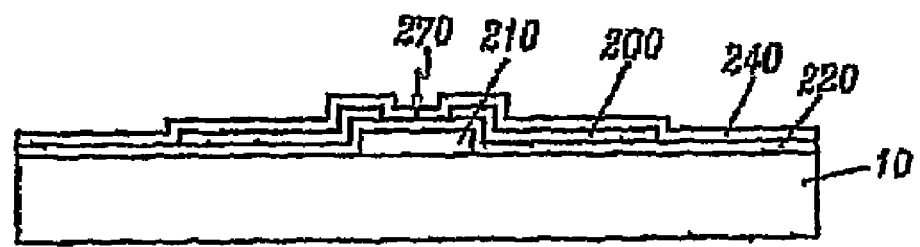

As shown in FIG. 20C, a passivation film 220 is formed, and a transparent conductive material such as ITO is deposited and patterned to form a pixel electrode 200. In this step, an aperture pattern 270 with a width of 3 microns to 20 microns is formed in the pixel electrode 200.

Then, a vertical alignment layer 240 is coated thereon.

As a result, the aperture pattern 270 may be formed in the steps of forming the pixel electrode 200 without any additional step.

The TFT and the color filter substrate 10 and 20 formed according to the methods shown in FIG. 19A to 19E and in FIG. 20A to 20D are assembled with each other in a manner that the protrusions 170 and the aperture patterns 270 are alternately arranged with a space therebetween. After liquid crystal having native dielectric anisotropy is injected between the two substrates 10 and 20, polarizers are attached on the surfaces of the substrates in a manner that the polarizing directions have a right angle each other.

The polarizing directions are at an angle of 45 degrees or at a right angle with respect to the protrusions 170 and apertures 270.

As described above, the apertures are formed at the step of forming the ITO pixel electrode and a passivation film does not have to be coated on color filters before the step of forming the protrusions so that additional steps to realize a VA-LCD having four-domains does not have to be performed.

Therefore, a wide-viewing angle is obtained.

Furthermore, the black matrix or the gate line corresponds to the portions where the protrusions and the apertures are formed or the structure of the pixel electrode are changed so that lightness and contrast ratio are improved.

In the drawings and specification, there have been disclosed typical preferred embodiments of the invention and, although specific terms are employed, they are used in a generic and descriptive sense only and not for purposes of limitation, the scope of the invention being set forth in the following claims.

What is claimed is:

1. A liquid crystal display, comprising:
a first substrate;
a gate line disposed on the first substrate;
a pixel electrode disposed on the first substrate;
a second substrate facing the first substrate;
a common electrode disposed on the second substrate;
a first domain partitioning member disposed on one of the first substrate and the second substrate and including a first portion disposed in a direction substantially parallel to the gate line, a second portion obliquely extending from an end of the first portion, and a third portion obliquely extending from the end of the first portion; and
a second domain partitioning member disposed on one of the first substrate and the second substrate and including a fourth portion disposed in a direction substantially parallel to the gate line.

2. The liquid crystal display of claim 1, wherein the first domain partitioning member comprises a fifth portion extending in a direction substantially parallel to the second portion and a sixth portion extending in a direction substantially parallel to the third portion.

3. The liquid crystal display of claim 2, wherein the first domain partitioning member comprises a seventh portion extending from the fifth portion and an eighth portion extending from the sixth portion, and the seventh portion and the eighth portion extend in a direction substantially perpendicular to the gate line.

4. The liquid crystal display of claim 3, wherein the seventh and the eighth portions overlap at least one edge of the pixel electrode.

5. The liquid crystal display of claim 4, wherein the first domain partitioning member is a protrusion disposed on the common electrode and the second domain partitioning member is an aperture of the pixel electrode.

6. The liquid crystal display of claim 1, wherein the first portion and the fourth portion are disposed substantially parallel to one another along a straight line.

7. The liquid crystal display of claim 6, wherein the first domain partitioning member is a protrusion disposed on the common electrode and the second domain partitioning member is an aperture of the pixel electrode.

8. A liquid crystal display, comprising:
a first substrate;
a gate line disposed on the first substrate;
a pixel electrode disposed on the first substrate;
a second substrate facing the first substrate;
a common electrode disposed on the second substrate;
a first domain partitioning member disposed on one of the first substrate and the second substrate and including a first portion extending in a direction substantially oblique to the gate line and a second portion obliquely extending from an end of second portion; and
a second domain partitioning member disposed on one of the first substrate and the second substrate and including a third portion disposed in a direction substantially parallel to the gate line.

9. The liquid crystal display of claim 8, wherein the first portion and the second portion form a wedge-shape.

10. The liquid crystal display of claim 8, wherein the first domain partitioning member comprises a fourth portion extending from the first portion and a fifth portion extending from the second portion, the fourth portion and the fifth portion extend in a direction substantially perpendicular to the gate line.

11. The liquid crystal display of claim 10, wherein the first domain partitioning member comprises a sixth portion extending in a direction substantially parallel to the first portion and a seventh portion extending in a direction substantially parallel to the second portion.

12. The liquid crystal display of claim 11, wherein the first domain partitioning member comprises an eighth portion extending from the sixth portion and a ninth portion extending from the seventh portion, and the eighth portion and the ninth portion extend in a direction substantially perpendicular to the gate line.

13. The liquid crystal display of claim 12, wherein the fourth and the fifth portion overlap at least one edge of the pixel electrode.

14. The liquid crystal display of claim 12, wherein the eighth and the ninth portion overlap at least one edge of the pixel electrode.

15. The liquid crystal display of claim 14, wherein the first domain partitioning member is a protrusion disposed on the common electrode and the second domain partitioning member is an aperture of the pixel electrode.

16. The liquid crystal display of claim 8, wherein the first domain partitioning member comprises a sixth portion extending in a direction substantially parallel to the first portion and a seventh portion extending in a direction substantially parallel to the second portion.

17. The liquid crystal display of claim 16, wherein the first domain partitioning member comprises an eighth portion extending from the sixth portion and a ninth portion extending from the seventh portion, the eighth portion and the ninth portion extend in a direction substantially perpendicular to the gate line.

18. The liquid crystal display of claim 17, wherein the eighth and the ninth portion overlap at least one edge of the pixel electrode.

19. The liquid crystal display of claim 18, wherein the first domain partitioning member is a protrusion disposed on the common electrode and the second domain partitioning member is an aperture of the pixel electrode.

20. The liquid crystal display of claim 8, wherein the first domain partitioning member is a protrusion disposed on the common electrode and the second domain partitioning member is an aperture of the pixel electrode.

21. A liquid crystal display, comprising:
a first substrate;
a gate line disposed on the first substrate;
a pixel electrode disposed on the first substrate;
a second substrate facing the first substrate;
a common electrode disposed on the second substrate;
a first domain partitioning member disposed on one of the first substrate and the second substrate and including a first portion disposed in a direction substantially parallel to the gate line, a second portion obliquely extending from an end of the first portion, a third portion obliquely extending from the end of the first portion, a fourth portion extending from the second portion, and a fifth portion extending from the third portion; and
a second domain partitioning member disposed on one of the first substrate and the second substrate and including a sixth portion disposed in a direction substantially parallel to the gate line,
wherein the fourth portion and the fifth portion extend in a direction substantially perpendicular to the gate line.

22. The liquid crystal display of claim 21, wherein the fourth and the fifth portion overlap at least one edge of the pixel electrode.

23. The liquid crystal display of claim 22, wherein the first domain partitioning member comprises a seventh portion extending in a direction substantially parallel to the second portion and an eighth portion extending in a direction substantially parallel to the third portion.

24. The liquid crystal display of claim 23, wherein the first domain partitioning member comprises a ninth portion extending from the seventh portion and a tenth portion extending from the eighth portion.

25. The liquid crystal display of claim 24, wherein the ninth portion and the tenth portion extend in a direction substantially perpendicular to the gate line.

26. The liquid crystal display of claim 24, wherein the first portion and the sixth portion are disposed substantially parallel to one another along a straight line.

27. The liquid crystal display of claim 24, wherein the first domain partitioning member is a protrusion disposed on the common electrode and the second domain partitioning member is an aperture of the pixel electrode.

28. The liquid crystal display of claim 21, wherein the first domain partitioning member is a protrusion disposed on the common electrode and the second domain partitioning member is an aperture of the pixel electrode.

29. A liquid crystal display, comprising:
a first substrate;
a gate line disposed on the first substrate;
a pixel electrode disposed on the first substrate;
a second substrate facing the first substrate;
a common electrode disposed on the second substrate;

a first domain partitioning member disposed on one of the first substrate and the second substrate and including a first portion disposed in a direction substantially parallel to the gate line, a second portion obliquely extending from an end of the first portion, and a third portion obliquely extending from the end of the first portion; and a second domain partitioning member disposed on one of the first substrate and the second substrate and including a fourth portion disposed in a direction substantially parallel to the second portion and a fifth portion disposed in a direction substantially parallel to the third portion.

30. The liquid crystal display of claim 29, wherein the first domain partitioning member comprises a sixth portion extending in a direction substantially parallel to the second portion and a seventh portion extending in a direction substantially parallel to the third portion.

31. The liquid crystal display of claim 30, wherein the first domain partitioning member comprises an eighth portion extending from the sixth portion and a ninth portion extending from the seventh portion, and the eighth portion and the ninth portion extend in a direction substantially perpendicular to the gate line.

32. The liquid crystal display of claim 31, wherein the eighth and the ninth portions overlap at least one edge of the pixel electrode.

33. The liquid crystal display of claim 32, wherein the first domain partitioning member and the second domain partitioning member are alternately disposed along an axis of the pixel electrode.

34. The liquid crystal display of claim 33, wherein the first domain partitioning member is a protrusion disposed on the common electrode and the second domain partitioning member is an aperture of the pixel electrode.

35. The liquid crystal display of claim 29, wherein the first domain partitioning member and the second domain partitioning member are alternately disposed along an axis of the pixel electrode.

36. The liquid crystal display of claim 35, wherein the first domain partitioning member is a protrusion disposed on the common electrode and the second domain partitioning member is an aperture of the pixel electrode.

37. The liquid crystal display of claim 29, wherein the second portion and the third portion form a wedge-shape.

38. The liquid crystal display of claim 29, wherein the first domain partitioning member and the second domain partitioning member are substantially symmetric about a line substantially parallel to the first portion.

39. A liquid crystal display, comprising:
a first substrate;
a gate line disposed on the first substrate;
a pixel electrode disposed on the first substrate;
a second substrate facing the first substrate;
a common electrode disposed on the second substrate;
a first domain partitioning member disposed on the first substrate and the second substrate and including a first portion extending in a direction oblique to the gate line, a second portion obliquely extending from an end of the first portion, a third portion extending from the first portion and a fourth portion extending from the second portion; and
a second domain partitioning member disposed on one of the first substrate and the second substrate and including a fifth portion disposed in a direction substantially parallel to the first portion and a sixth portion disposed in a direction substantially parallel to the second portion, wherein the third portion and the fourth portion extend in a direction substantially perpendicular to the gate line.

40. The liquid crystal display of claim 39, wherein the first domain partitioning member comprises a seventh portion extending in a direction substantially parallel to the first portion and an eighth portion extending in a direction substantially parallel to the second portion.

41. The liquid crystal display of claim 40, wherein the first domain partitioning member comprises a ninth portion extending from the seventh portion and a tenth portion extending from the eighth portion, the ninth portion and the tenth portion extend in a direction substantially perpendicular to the gate line.

42. The liquid crystal display of claim 41, wherein the ninth and the tenth portions overlap at least one edge of the pixel electrode.

43. The liquid crystal display of claim 42, wherein the first domain partitioning member is a protrusion disposed on the common electrode and the second domain partitioning member is an aperture of the pixel electrode.

44. The liquid crystal display of claim 39, wherein the first domain partitioning member is a protrusion disposed on the common electrode and the second domain partitioning member is an aperture of the pixel electrode.

45. The liquid crystal display of claim 39, wherein the first portion and the second portion form a wedge-shape.

46. A liquid crystal display, comprising:
a first substrate;
a gate line disposed on the first substrate;
a pixel electrode disposed on the first substrate;
a second substrate disposed facing the first substrate;
a common electrode disposed on the second substrate;
a first domain partitioning member disposed on one of the first substrate and the second substrate and including a first portion disposed in a direction substantially parallel to the gate line, a second portion obliquely extending from an end of the first portion, a third portion obliquely extending from the end of the first portion, a fourth portion extending from the second portion, and a fifth portion extending from the third portion, wherein the fourth portion and the fifth portion extend in a direction substantially perpendicular to the gate line; and
a second domain partitioning member disposed on one of the first substrate and the second substrate and including a sixth portion disposed in a direction substantially parallel to the second portion and a seventh portion disposed in a direction substantially parallel to the third portion.

47. The liquid crystal display of claim 46, wherein the fourth and fifth portions overlap at least one edge of the pixel electrode.

48. The liquid crystal display of claim 47, wherein the first domain partitioning member comprises an eighth portion extending in a direction substantially parallel to the second portion and a ninth portion extending in a direction substantially parallel to the third portion.

49. The liquid crystal display of claim 48, wherein the first domain partitioning member comprises a tenth portion extending from the eighth portion and an eleventh portion extending from the ninth portion, and the tenth portion and the eleventh portion extend in a direction substantially perpendicular to the gate line.

50. The liquid crystal display of claim 49, wherein the first domain partitioning member is a protrusion disposed on the common electrode and the second domain partitioning member is an aperture of the pixel electrode.

51. A liquid crystal display, comprising:
a first substrate;
a gate line disposed on the first substrate;

a pixel electrode disposed on the first substrate;
a second substrate facing the first substrate;
a common electrode disposed on the second substrate;
a first domain partitioning member disposed on one of the first substrate and the second substrate and including a first portion disposed in a direction substantially parallel to the gate line, a second portion obliquely extending from an end of the first portion, and a third portion obliquely extending from the end of the first portion; and
a second domain partitioning member disposed on one of the first substrate and the second substrate and including a fourth portion disposed in a direction substantially parallel to the gate line, a fifth portion disposed in a direction substantially parallel to the second portion, and a sixth portion disposed in a direction substantially parallel to the third portion.

52. The liquid crystal display of claim 51, wherein the first domain partitioning member comprises a seventh portion extending in a direction substantially parallel to the second portion and an eighth portion extending in a direction substantially parallel to the third portion.

53. The liquid crystal display of claim 52, wherein the first domain partitioning member comprises a ninth portion extending from the seventh portion and a tenth portion extending from the eighth portion, and the ninth portion and the tenth portion extend in a direction substantially perpendicular to the gate line.

54. The liquid crystal display of claim 53, wherein the ninth and the tenth portions overlap at least one edge of the pixel electrode.

55. The liquid crystal display of claim 54, wherein the first domain partitioning member and the second domain partitioning member are alternately disposed along an axis of the pixel electrode.

56. The liquid crystal display of claim 55, wherein the first domain partitioning member is a protrusion disposed on the common electrode and the second domain partitioning member is an aperture of the pixel electrode.

57. The liquid crystal display of claim 51, wherein the first domain partitioning member and the second domain partitioning member are alternately disposed along an axis of the pixel electrode.

58. The liquid crystal display of claim 57, wherein the first domain partitioning member is a protrusion disposed on the common electrode and the second domain partitioning member is an aperture of the pixel electrode.

59. The liquid crystal display of claim 51, wherein the first portion and the fourth portion are disposed substantially parallel to one another along a straight line.

60. A liquid crystal display, comprising:
a first substrate;
a gate line disposed on the first substrate;
a pixel electrode disposed on the first substrate;
a second substrate facing the first substrate;
a common electrode disposed on the second substrate;
a first domain partitioning member disposed on one of the first substrate and the second substrate and including a first portion extending in a direction substantially oblique to the gate line and a second portion obliquely extending from an end of the first portion; and
a second domain partitioning member disposed on one of the first substrate and the second substrate and including a third portion disposed in a direction substantially parallel to the gate line, a fourth portion disposed in a direction substantially parallel to the first portion, and a fifth portion disposed in a direction substantially parallel to the second portion.

61. The liquid crystal display of claim 60, wherein the first domain partitioning member comprises a sixth portion extending from the first portion and a seventh portion extending from the second portion, and the sixth portion and the seventh portion extend in a direction substantially perpendicular to the gate line.

62. The liquid crystal display of claim 61, wherein the first domain partitioning member comprises an eighth portion extending in a direction substantially parallel to the first portion and a ninth portion extending in a direction substantially parallel to the second portion.

63. The liquid crystal display of claim 62, wherein the first domain partitioning member comprises a tenth portion extending from the eighth portion and an eleventh portion extending from the ninth portion, and the tenth portion and the eleventh portion extend in a direction substantially perpendicular to the gate line.

64. The liquid crystal display of claim 63, wherein the tenth and the eleventh portions overlap at least one edge of the pixel electrode.

65. The liquid crystal display of claim 63, wherein the sixth and the seventh portions overlap at least one edge of the pixel electrode.

66. The liquid crystal display of claim 65, wherein the first domain partitioning member and the second domain partitioning member are alternately disposed along an axis of the pixel electrode.

67. The liquid crystal display of claim 66, wherein the first domain partitioning member is a protrusion disposed on the common electrode and the second domain partitioning member is an aperture of the pixel electrode.

68. The liquid crystal display of claim 60, wherein the first domain partitioning member comprises an eighth portion extending in a direction substantially parallel to the first portion and a ninth portion extending in a direction substantially parallel to the second portion.

69. The liquid crystal display of claim 68, wherein the first domain partitioning member comprises a tenth portion extending from the eighth portion and an eleventh portion extending from the ninth portion, and the tenth portion and the eleventh portion extend in a direction substantially perpendicular to the gate line.

70. The liquid crystal display of claim 69, wherein the tenth and the eleventh portions overlap at least one edge of the pixel electrode.

71. The liquid crystal display of claim 70, wherein the first domain partitioning member and the second domain partitioning member are alternately disposed along an axis of the pixel electrode.

72. The liquid crystal display of claim 71, wherein the first domain partitioning member is a protrusion disposed on the common electrode and the second domain partitioning member is an aperture of the pixel electrode.

73. The liquid crystal display of claim 60, wherein the first domain partitioning member and the second domain partitioning member are alternately disposed along an axis of the pixel electrode.

74. The liquid crystal display of claim 73, wherein the first domain partitioning member is a protrusion disposed on the common electrode and the second domain partitioning member is an aperture of the pixel electrode.

75. A liquid crystal display, comprising:
a first substrate;
a gate line disposed on the first substrate;
a pixel electrode disposed on the first substrate;
a second substrate facing the first substrate;
a common electrode disposed on the second substrate;

a first domain partitioning member disposed on one of the first substrate and the second substrate and including a first portion disposed in a direction substantially parallel to the gate line, a second portion obliquely extending from an end of the first portion, a third portion obliquely extending from the end of the first portion, a fourth portion extending from the second portion, and a fifth portion extending from the third portion, wherein the fourth portion and the fifth portion extend in a direction substantially perpendicular to the gate line; and a second domain partitioning member disposed on one of the first substrate and the second substrate and including a sixth portion disposed in a direction substantially parallel to the gate line, a seventh portion disposed in a direction substantially parallel to the second portion, and an eighth portion disposed in a direction substantially parallel to the third portion.

76. The liquid crystal display of claim 75, wherein the fourth and the fifth portions overlap at least one edge of the pixel electrode.

77. The liquid crystal display of claim 76, wherein the first domain partitioning member comprises a ninth portion extending in a direction substantially parallel to the second portion and a tenth portion extending in a direction substantially parallel to the third portion.

78. The liquid crystal display of claim 77, wherein the first domain partitioning member comprises an eleventh portion extending from the ninth portion and a twelfth portion extending from the tenth portion, and the eleventh portion and the twelfth portion extend in a direction substantially perpendicular to the gate line.

79. The liquid crystal display of claim 78, wherein the eleventh and the twelfth portions overlap at least one edge of the pixel electrode.

80. The liquid crystal display of claim 79, wherein the first domain partitioning member and the second domain partitioning member are alternately disposed along an axis of the pixel electrode.

81. The liquid crystal display of claim 80, wherein the first domain partitioning member is a protrusion disposed on the common electrode and the second domain partitioning member is an aperture of the pixel electrode.

82. The liquid crystal display of claim 75, wherein the first domain partitioning member and the second domain partitioning member are alternately disposed along an axis of the pixel electrode.

83. The liquid crystal display of claim 82, wherein the first domain partitioning member is a protrusion disposed on the common electrode and the second domain partitioning member is an aperture of the pixel electrode.

84. The liquid crystal display of claim 75, wherein the first portion and the eleventh portion are disposed substantially parallel to one another along a straight line.

85. A liquid crystal display, comprising:
a first substrate;
a gate line disposed on the first substrate;
a pixel electrode disposed on the first substrate;
a second substrate facing the first substrate;
a common electrode disposed on the second substrate;
a first domain partitioning member disposed on the common electrode and including a first protrusion, a second protrusion and a third protrusion, wherein the first protrusion includes a first portion disposed in a direction substantially parallel to the gate line, a second portion obliquely extending from an end of the first portion, a third portion obliquely extending from the end of the first portion, a fourth portion extending from the second portion, and a fifth portion extending from the third portion, the second protrusion includes a sixth portion extending in a direction substantially parallel to the second portion, and a seventh portion extending from the sixth portion, and the third protrusion includes an eighth portion extending in a direction substantially parallel to the third portion, and a ninth portion extending from the eighth portion; and a second domain partitioning member disposed on the pixel electrode and including at least one apertures, wherein the aperture includes a tenth portion disposed in a direction substantially parallel to the gate line, an eleventh portion disposed in a direction substantially parallel to the second portion, and a twelfth portion disposed in a direction substantially parallel to the third portion, wherein the fourth, fifth, seventh and ninth portions extend in directions substantially perpendicular to the gate line.

86. The liquid crystal display of claim 85, wherein the fourth, fifth, seventh and the ninth portions overlap at least one edge of the pixel electrode.

87. The liquid crystal display of claim 85, wherein the first portion and the tenth portion are disposed substantially parallel to one another along a straight line.

88. The liquid crystal display of claim 85, wherein the second portion and the third portion form a wedge shape.

* * * * *